US012573743B2

(12) United States Patent
Wei et al.

(10) Patent No.: US 12,573,743 B2
(45) Date of Patent: Mar. 10, 2026

(54) MILLIMETER WAVE (mmW) INTEGRATED HINGE

(71) Applicant: QUALCOMM Incorporated, San Diego, CA (US)

(72) Inventors: Cheng-Fan Wei, New Taipei City (TW); Chao-Kuei Chang, Taipei City (TW); Yi-Hsiang Kung, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 18/340,698

(22) Filed: Jun. 23, 2023

(65) Prior Publication Data

US 2024/0429592 A1 Dec. 26, 2024

(51) Int. Cl.

| | |
|---|---|
| ***H01Q 1/22*** | (2006.01) |
| ***H01Q 1/02*** | (2006.01) |
| ***H01Q 1/44*** | (2006.01) |
| ***H01Q 21/08*** | (2006.01) |

(52) U.S. Cl.

CPC ............. *H01Q 1/2266* (2013.01); *H01Q 1/02* (2013.01); *H01Q 1/44* (2013.01); *H01Q 21/08* (2013.01)

(58) Field of Classification Search

CPC .......... H01Q 1/2266; H01Q 1/02; H01Q 1/44; H01Q 21/08; H01Q 5/40

See application file for complete search history.

(56) References Cited

U.S. PATENT DOCUMENTS

| | | | | |
|---|---|---|---|---|
| 5,337,066 | A | 8/1994 | Hirata et al. | |
| 5,527,001 | A | 6/1996 | Stuart | |
| 10,483,614 | B2 * | 11/2019 | Besel | H01P 5/02 |
| 2018/0254540 | A1 | 9/2018 | Yoo et al. | |
| 2022/0166127 | A1 * | 5/2022 | Jeong | H01L 23/66 |
| 2022/0286542 | A1 | 9/2022 | Seo et al. | |
| 2023/0096131 | A1 * | 3/2023 | Wei | H01Q 1/02 343/866 |
| 2025/0172967 | A1 * | 5/2025 | Yu | G06F 1/1698 |

OTHER PUBLICATIONS

International Search Report and Written Opinion—PCT/US2024/032641—ISA/EPO—Sep. 20, 2024.

* cited by examiner

*Primary Examiner* — Seung H Lee

(74) *Attorney, Agent, or Firm* — Polsinelli//Qualcomm Incorporated

(57) ABSTRACT

Aspects described herein include millimeter wave integrated hinges. In one aspect, wireless communication apparatus includes a bracket, a first pivot structure attached to the bracket configured to pivot the bracket around a first line, and a second pivot structure attached to the bracket and configured to pivot the bracket around a second line, wherein the second line is parallel to the first line. A millimeter wave antenna array is mounted to the bracket such that the mmW antenna array is positioned between the first line and the second line.

29 Claims, 21 Drawing Sheets

1x8 array on a Module

MILLIMETER WAVE (mmW) INTEGRATED HINGE

FIELD

The present disclosure relates generally to electronics and wireless communications, and more specifically to antennas for use with such wireless communications.

BACKGROUND

Wireless communication devices and technologies are becoming ever more prevalent. Wireless communication devices generally transmit and receive communication signals. A communication signal is typically processed by a variety of different components and circuits. In some modern communication systems, many different wavelengths of electromagnetic waves can be used in a single device. Supporting different wavelengths for wireless communications can involve managing complex interactions among device elements while managing interactions and interference between elements supporting communications on the different wavelengths.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Aspects described herein include millimeter wave (mmW) modules and arrays including one or more antennas for communications at frequencies above 20 gigahertz (GHz) (e.g., above approximately 24 GHz). Wireless communications at such frequencies can be highly directional, and the directional wireless signals can be subject to occlusion in electronic devices with adjustable physical configurations, such as hinged laptops.

Aspects described herein include elements of a mmW communication apparatus integrated with a hinge, pivot structure, or movable joint structure of an electronic device with a configuration to limit signal blockage associated with movement of the structure.

One aspect is wireless communication apparatus, comprising: a millimeter wave (mmW) module comprising a mmW antenna array; at least one mmW signal node configured to communicate mmW signals in association with the mmW antenna array; a first joint having an attachment leaf and a central leaf; and a second joint having an attachment leaf and a central leaf; where the central leaf of the first joint and the central leaf of the second joint are configured in a shared plane to align the mmW antenna array of the mmW module to limit signal obstruction from objects attached to the attachment leaf of the first joint and the attachment leaf of the second joint.

Some such aspects operate where the mmW antenna array is configured to radiate the mmW signals in a boresight direction perpendicular to the shared plane at frequencies greater than 20 gigahertz (GHz). Some such aspects operate where the mmW module is mounted to a heatsink coupled to the central leaf of the first joint or the central leaf of the second joint. Some such aspects operate where the mmW module is coupled to the heatsink via a heat dispersion adhesive.

Some such aspects operate where the mmW module is mounted to the bracket; and the bracket is coupled to the central leaf of the first joint and the central leaf of the second joint such that the first joint creates a first degree of freedom for rotation of the first joint around a first line and the second joint creates a second degree of freedom for rotation of the second joint around a second line parallel to the first line. Some such aspects operate where the mmW module is removably mounted to the bracket via a socket comprising an electrical connection that provides a data path from the mmW module to a first object of the objects attached to the attachment leaf of the first joint.

Some such aspects operate where a first object of the objects is a computing device comprising one or more processors and a keyboard attached to the attachment leaf of the first joint.

Some such aspects operate where a second object of the objects is a display screen attached to the attachment leaf of the second joint.

Some such aspects operate where the first joint and the second joint are configured to orient the mmW antenna array with a boresight between the display screen and the keyboard and the first joint and the second joint rotate the keyboard and the display screen from a closed position where the keyboard is facing the display screen in parallel planes to an open position where the keyboard is facing away from the display screen in parallel planes.

Some such aspects operate where the computing device comprises: a second mmW module, where the boresight of the mmW module is directed in a first direction relative to the central leaf, and boresight of the second mmW module is directed in a second direction relative to the central leaf that is different than the first direction; and a third mmW module having a boresight directed in a third direction different from the second direction and the first direction.

Some such aspects operate where the bracket is configured to function as a heatsink mechanically coupled to the mmW module to facilitate heat transfer away from the mmW module and to radiate heat into air around the bracket. Some such aspects operate where the heatsink is configured to dissipate heat received from the mmW module via a thermally conductive adhesive. Some such aspects further comprise a non-mmW antenna integrated with the heatsink.

Another aspect is wireless communication apparatus comprising: a bracket; a millimeter wave (mmW) module comprising a mmW antenna array; means for attaching the mmW module to the bracket; means for setting an angle between the bracket and a first object coupled to the bracket along a first line; and means for setting an angle between the bracket and a second object coupled to the bracket along a second line parallel to the first line.

Another aspect is a wireless communication apparatus, comprising: a bracket; a first pivot structure attached to the bracket configured to pivot the bracket around a first line; and a second pivot structure attached to the bracket and configured to pivot the bracket around a second line, where the second line is parallel to the first line; and a millimeter wave (mmW) antenna array mounted to the bracket, where the mmW antenna array is positioned between the first line and the second line.

Some such aspects operate where the mmW antenna array is configured to radiate mmW signals in a boresight direction perpendicular to a plane formed by the first line and the second line at frequencies greater than 20 gigahertz (GHz).

Some such aspects further comprise a mmW module coupled to the bracket, where the mmW module is positioned between the first line and the second line of the bracket. Some such aspects operate where the mmW module is mounted to the bracket via a heatsink coupled the bracket. Some such aspects operate where the mmW module is coupled to the heatsink via a heat dispersion adhesive.

Some such aspects operate where a pivot position of the first pivot structure and a pivot position of the second pivot structure are configured to orient the mmW antenna array to limit signal obstruction from objects attached to the first pivot structure and the second pivot structure.

Some such aspects further include a first electrical device coupled to a first leaf of the first pivot structure, where the bracket is coupled to a second leaf of the first pivot structure, such that the first leaf and the second leaf pivot independently around the first line.

Some such aspects operate where the first electrical device comprises a millimeter wave integrated circuit (MMWIC), where the MMWIC is coupled to the mmW antenna array via a flexible mmW cable.

Some such aspects operate where the wireless communication apparatus comprises a laptop computer, where the first electrical device further comprises one or more processors and a keyboard.

Some such aspects further include a display screen coupled to a first leaf of the second pivot structure, where the bracket is coupled to a second leaf of the second pivot structure, such that the bracket is configured between the first pivot structure and the second pivot structure with two degrees of freedom relative to the display screen attached to the first leaf of the first pivot structure.

Some aspects further comprise a thermally conductive adhesive used to physically attach portions of one or more surfaces of the means for receiving the mmW signal to portions of one or more surfaces of the means for jointly receiving the non-mmW signal while dissipating the thermal energy received from the means for receiving the mmW signal.

Some aspects further comprise a thermally conductive adhesive used to physically attach portions of one or more surfaces of the means for receiving the mmW signal to portions of one or more surfaces of the means for jointly receiving the non-mmW signal while dissipating the thermal energy received from the means for receiving the mmW signal.

In some aspects, the apparatuses described above can include a mobile device with a camera for capturing one or more pictures. In some aspects, the apparatuses described above can include a display screen for displaying one or more pictures. The summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102*a*" or "102*b*", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
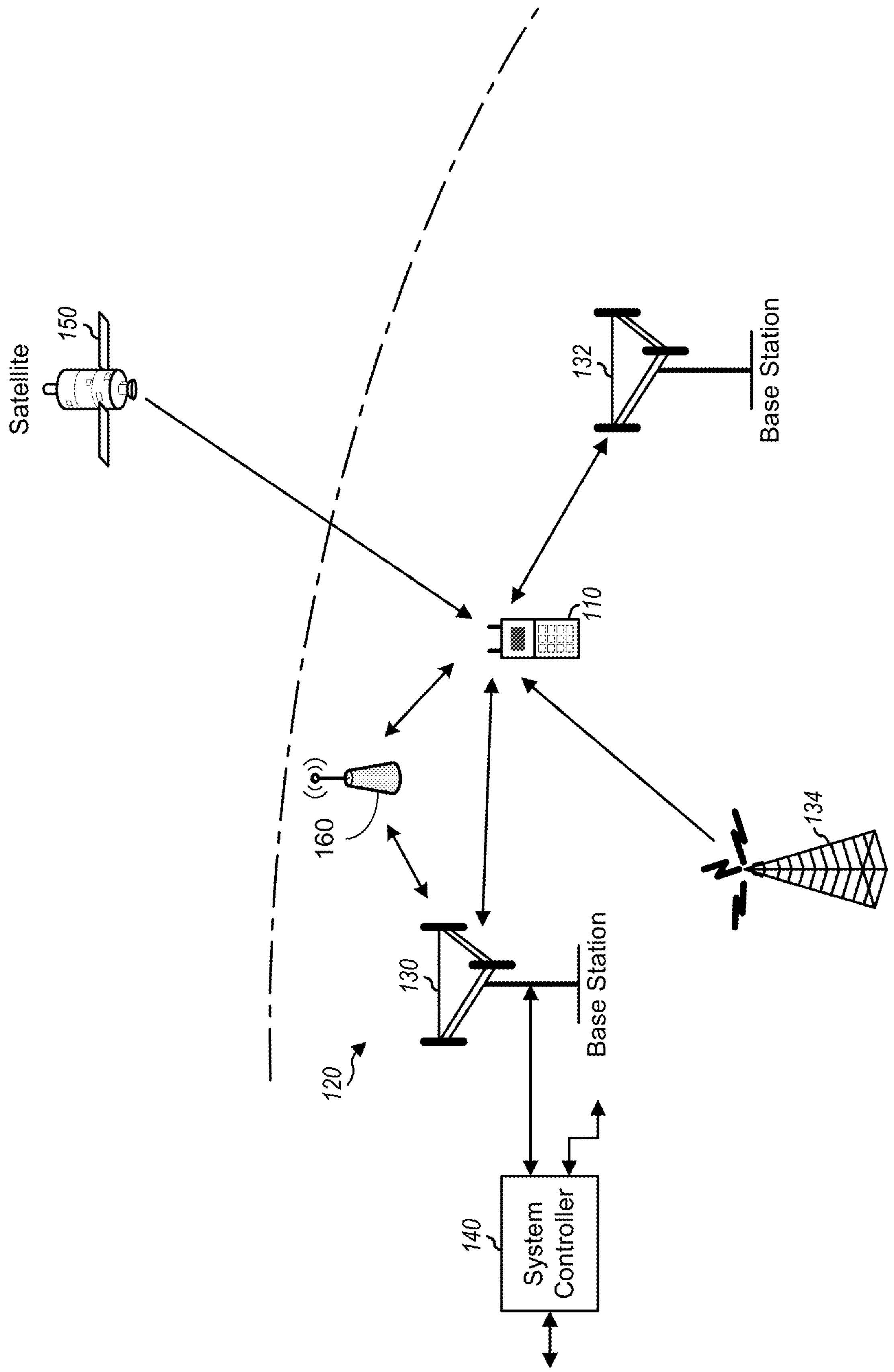
FIG. 1 is a diagram showing a wireless communication system communicating with a wireless device that can be implemented according to aspects described herein.

The detailed description set forth below in connection with the appended drawings is intended as a description of exemplary implementations and is not intended to represent the only implementations in which the invention may be practiced. Examples, aspects, and exemplary embodiments as described herein refer to details "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

Standard form factors for devices such as cell phones, tablets, laptop computers, cellular hotspot devices, and other such devices are subject to increasingly limited space. At the same time, additional wireless communication systems are being integrated into such devices. Performance and space tradeoffs are design considerations in all such devices. Millimeter wavelength (mmW) modules that include mmW circuitry (e.g., transmission (Tx) and receive (Rx) elements for mmW communications) are subject to significant power usage and associated heat generation. Additionally, mmW communications are subject to directionality where objects in a line-of-sight between antenna arrays degrade or eliminate communications due to the blocking of the mmW signals.

For configurable hinged electronic devices such as laptops with a hinge between a display and a keyboard, flip-phones or tablets with a hinge between a display and a keypad, or other such devices, the position of the hinge can impact mmW communication performance when the mmW antenna array is obstructed. For certain devices, such as laptops designed for multiple operating modes such as a tablet mode as well as a keyboard mode, mmW antenna array placement to allow communications across multiple operating modes can present a significant design challenge.

According to aspects described herein, a device is provided with one or more mmW modules or mmW antenna arrays integrated with a device hinge of the device. The mmW module or array can send and/or receive signals from a processing device via a communication (e.g., signal) node (e.g., on a conductive communication line or path) between the processing device and the mmW module or array. In some cases, the device hinge is structured with multiple degrees of freedom to allow an mmW antenna array to be directed independently of the objects attached to the hinge. Such a hinge can be configured to direct the boresight of a mmW antenna array to reduce obstruction of mmW signals from devices coupled by the hinge.

Additionally, mmW modules can generate significant amounts of heat, and dispersing heat from active mmW modules can cause design issues. Aspects described herein include devices with hinges configured to provide heat dispersion for integrated mmW and non-mmW antennas. Such aspects can include the use of heat dispersing materials functioning both as a mechanical hinge as well as a heatsink, or can include modular mechanical connection of heatsink and antenna materials onto a hinge bracket or other parts of a hinge structure. Aspects include devices with a hinge modified for wireless antenna and heatsink integration, along with integrating support for communication paths or data feeds (e.g., a connection point for passing electrical signals generated from wireless signals between antennas and processing circuitry). In some aspects, heatsink structures can be jointly structured for both dissipation of thermal energy and antenna operation for non-mmW frequencies.

Such a device may improve the performance of the device with improved communication performance in certain device configurations and positions relative to wireless nodes. Additionally, such a device may further increase efficient usage of space and device cooling, allowing improved device performance for a given space and power usage. In some aspects, some such devices can leverage space efficiency where the combination of a heatsink and communication elements are integrated into a hinge structure for improved thermal performance and efficient space usage in a design. Additional device improvements will be apparent from the descriptions provided herein.

FIG. 1 is a diagram showing a wireless device 110 communicating with a wireless communication system 120. In accordance with aspects described herein, the wireless device 110 can include devices with a mmW integrated hinge in accordance with aspects described herein, along with device support for multiple different wireless communication technology systems. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. Communication elements of the wireless device 110 for implementing mmW and non-mmW communications in accordance with any such communication standards can be supported by various designs of a hinge in accordance with aspects described herein. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA 1×, EVDO, TD-SCDMA, GSM, 802.11, 5G, etc.

The wireless communication system 120 may also include a wireless device 160. In an exemplary embodiment, the wireless device 160 may be a wireless access point, or another wireless communication device that comprises, or comprises part of a wireless local area network (WLAN). In an exemplary embodiment, the wireless device 110 may be referred to as a customer premises equipment (CPE), which may be in communication with a base station 130 and a wireless device 110, or other devices in the wireless communication system 120. In some embodiments, the CPE may be configured to communicate with the wireless device 160 using WAN signaling and to interface with the base station 130 based on such communication instead of the wireless device 160 directly communicating with the base station 130. In exemplary embodiments where the wireless device 160 is configured to communicate using WLAN signaling, a WLAN signal may include WiFi, or other communication signals.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types-intra-band CA and inter-band CA. Intra-band CA refers to operation on multiple carriers within the same band. Inter-band CA refers to operation on multiple carriers in different bands.

FIG. 1 illustrates relative positions between the wireless devices 110, 160 and base stations 132, 130, etc. Due to the directionality of mmW communications, a wireless device such as the wireless device 110 may have multiple mmW modules with directional antenna arrays attempting to cover possible alignments with the base stations. If the device has a configuration where certain mmW modules are blocked by the configuration of the device, then either additional components are needed to maintain performance, or communication performance is degraded. As described in more detail below, a mmW integrated hinge in accordance with aspects described herein can provide improved space efficiency in a device with improved heat dissipation, while avoiding device configurations where mmW communications from a wireless device (e.g., the wireless device 110) and a base station (e.g., the base station 132) are blocked by objects or elements of the wireless device.

Figure 2A:
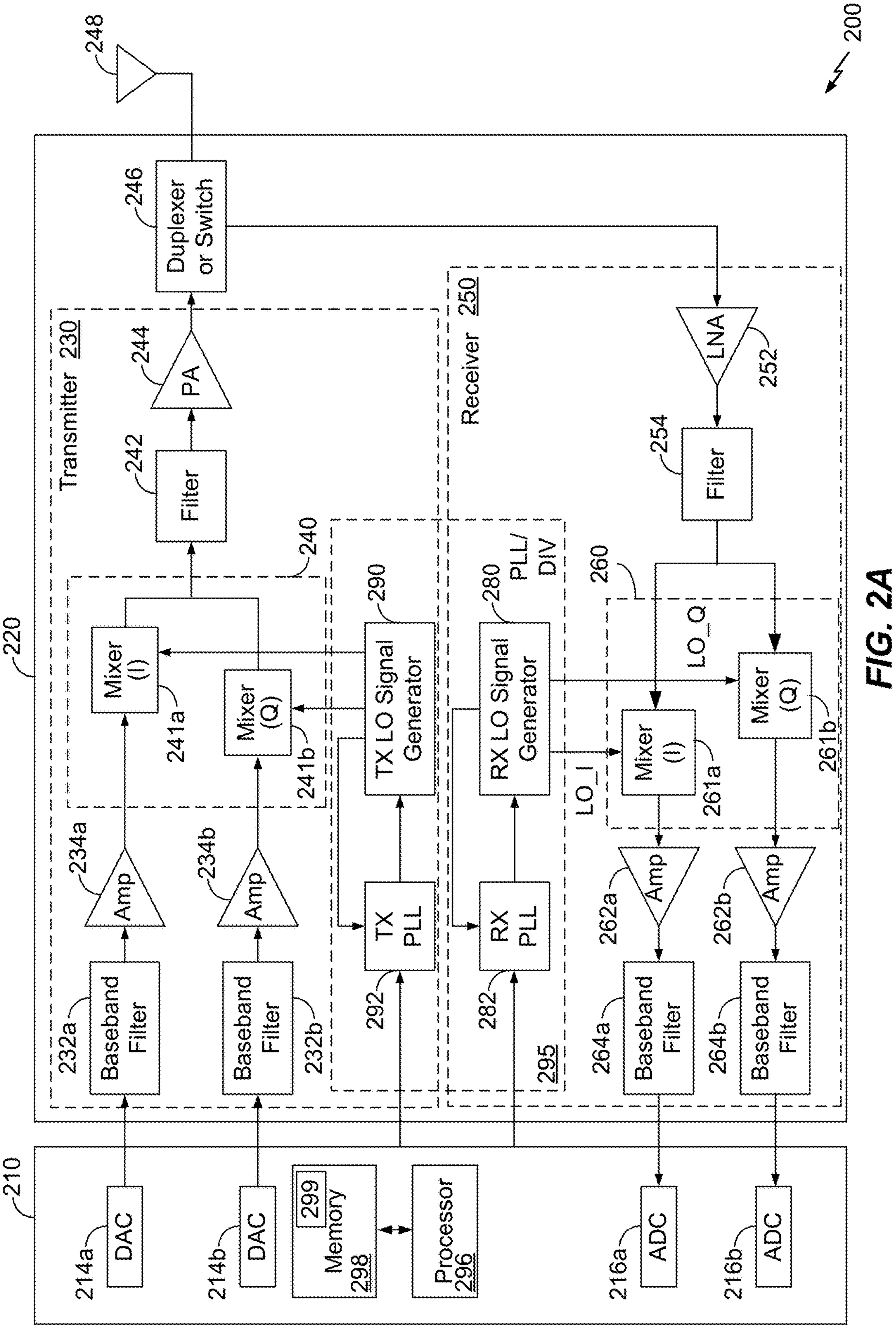
FIG. 2A is a block diagram showing portions of a wireless device in which aspects of the present disclosure may be implemented.

FIG. 2A is a block diagram showing a wireless device 200 in which aspects of the present disclosure may be implemented. The wireless device 200 may, for example, be an embodiment of the wireless device 110 illustrated in FIG. 1, or portions thereof may be an implementation of mmW circuitry in the mmW modules 610, 710, 810 or any other such mmW communication circuitry described herein. In some examples, the wireless device 200 (or any of the devices or elements illustrated in any of FIGS. 2A-2C) may be an example of any of the devices illustrated in FIG. 1 or portions thereof may be an example of circuitry in any mmW module of any figure described herein or implemented in a mmW integrated hinge in accordance with aspects described herein.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RFICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214*a* and 214*b* for converting digital signals generated by the data processor 210 into the I and Q analog output signals, e.g., I and Q output currents, for further processing. In other embodiments, the DACs 214*a* and 214*b* are included in the transceiver 220 and the data processor 210 provides data (e.g., for I and Q) to the transceiver 220 digitally.

Within the transmitter 230, bandpass (e.g., lowpass) filters 232*a* and 232*b* filter the I and Q analog transmit signals, respectively, to remove undesired images caused by the prior digital-to-analog conversion. Amplifiers (Amp) 234*a* and 234*b* amplify the signals from bandpass filters 232*a* and 232*b*, respectively, and provide I and Q baseband signals. An upconverter 240 having upconversion mixers 241*a* and 241*b* upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier 244 amplifies the signal from filter 242 to obtain the desired output power level and provides a transmit RF signal. The transmit RF signal is routed through a duplexer or switch 246 and transmitted via an antenna array 248. While examples discussed herein utilize I and Q signals, those of skill in the art will understand that components of the transceiver may be configured to utilize polar modulation.

In the receive path, the antenna array 248 receives communication signals and provides a received RF signal, which is routed through duplexer or switch 246 and provided to a low noise amplifier (LNA) 252. The switch 246 is designed to operate with a specific RX-to-TX duplexer frequency separation, such that RX signals are isolated from TX signals. The received RF signal is amplified by LNA 252 and filtered by a filter 254 to obtain a desired RF input signal. Downconversion mixers 261*a* and 261*b* in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262*a* and 262*b* and further filtered by baseband (e.g., lowpass) filters 264*a*, 264*b* to obtain I and Q analog input signals, which are provided to data processor 210. In the exemplary embodiment shown, the data processor 210 includes analog-to-digital-converters (ADC's) 216*a* and 216*b* for converting the analog input signals into digital signals to be further processed by the data processor 210. In some embodiments, the ADCs 216*a* and 216*b* are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit 295, which may include common or shared LO signal generator circuitry to provide the TX LO signals and the RX LO signals. Alternatively, separate LO generator circuits may be used to generate the TX LO signals and the RX LO signals.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the switch 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the power amplifier 244 and LNA 252 (and filter 242 and/or 254 in some examples) may be implemented separately from other components in the transmitter 230 and receiver 250, and may be implemented on a millimeter wave integrated circuit. An example super-heterodyne architecture is illustrated in FIG. 2B.

Figure 2B:
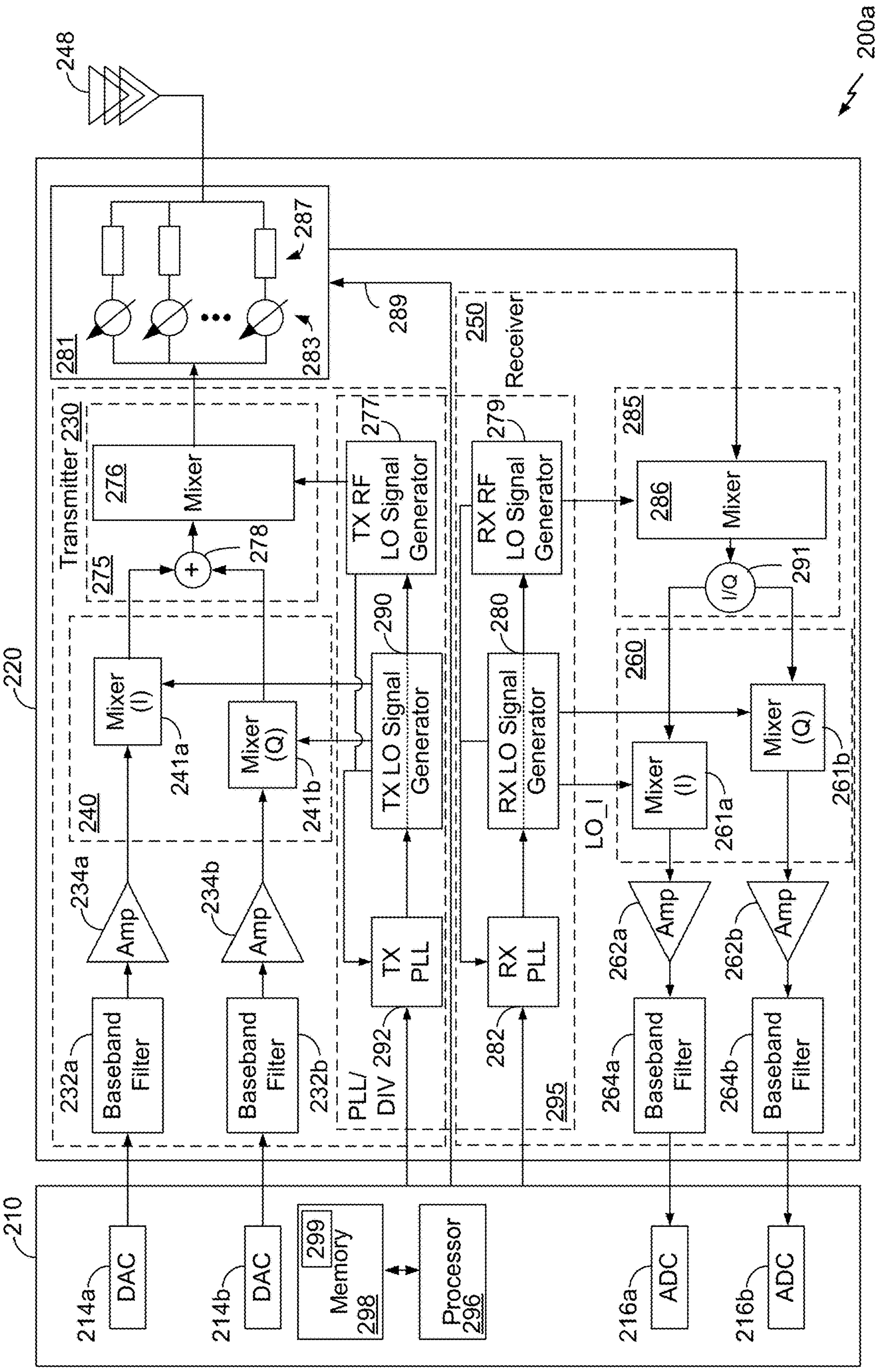
FIG. 2B is a block diagram showing portions of a wireless device in which aspects of the present disclosure may be implemented.

FIG. 2B is a block diagram showing a wireless device in which aspects of the present disclosure may be implemented. Certain components, for example which may be indicated by identical reference numerals, of the wireless device 200*a* in FIG. 2B may be configured similarly to those in the wireless device 200 shown in FIG. 2A and the description of identically numbered items in FIG. 2B will not be repeated.

The wireless device 200*a* is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise summing function 278 and upconversion mixer 276. The summing function 278 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted mmW signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 289 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the mmW transmit signal from the upconverter 275, alter the phase by an amount, and provide the mmW signal to a respective phased array element 287. Each phased array element 287 may comprise transmit and receive circuitry including one or more filters, amplifiers, driver amplifiers, and/or power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise an I/Q generation function 291 and a downconversion mixer 286. In an exemplary embodiment, the mixer 286 downconverts the receive mmW signal provided by the phase shift circuitry 281 to an IF signal according to RX mmW LO signals provided by an RX mmW LO signal generator 279. The I/Q generation function 291 receives the IF signal from the mixer 286 and generates I and Q signals for the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit. Any of the ICs described above may be an example of an IC in any of the mmW modules 610, 710, 810 or any mmW module recited herein or of the mmW integrated circuitry 914. Any of the modules described above may be an example of any of the mmW modules 610, 710, 810 or any mmW module recited herein.

In some embodiments, both the architecture illustrated in FIG. 2A and the architecture illustrated in FIG. 2B are implemented in the same device. For example, a wireless device 110 or 200 may be configured to communicate with signals having a frequency below about 20 GHz using the architecture illustrated in FIG. 2A and to communicate with signals having a frequency above about 20 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from mmW and signals that have been downconverted from mmW to baseband via an IF stage may be filtered by the same baseband filter. In other embodiments, a first version of the filter is included in the portion of the device which implements the architecture of FIG. 2A and a second version of the filter is included in the portion of the device which implements the architecture of FIG. 2B.

Figure 2C:
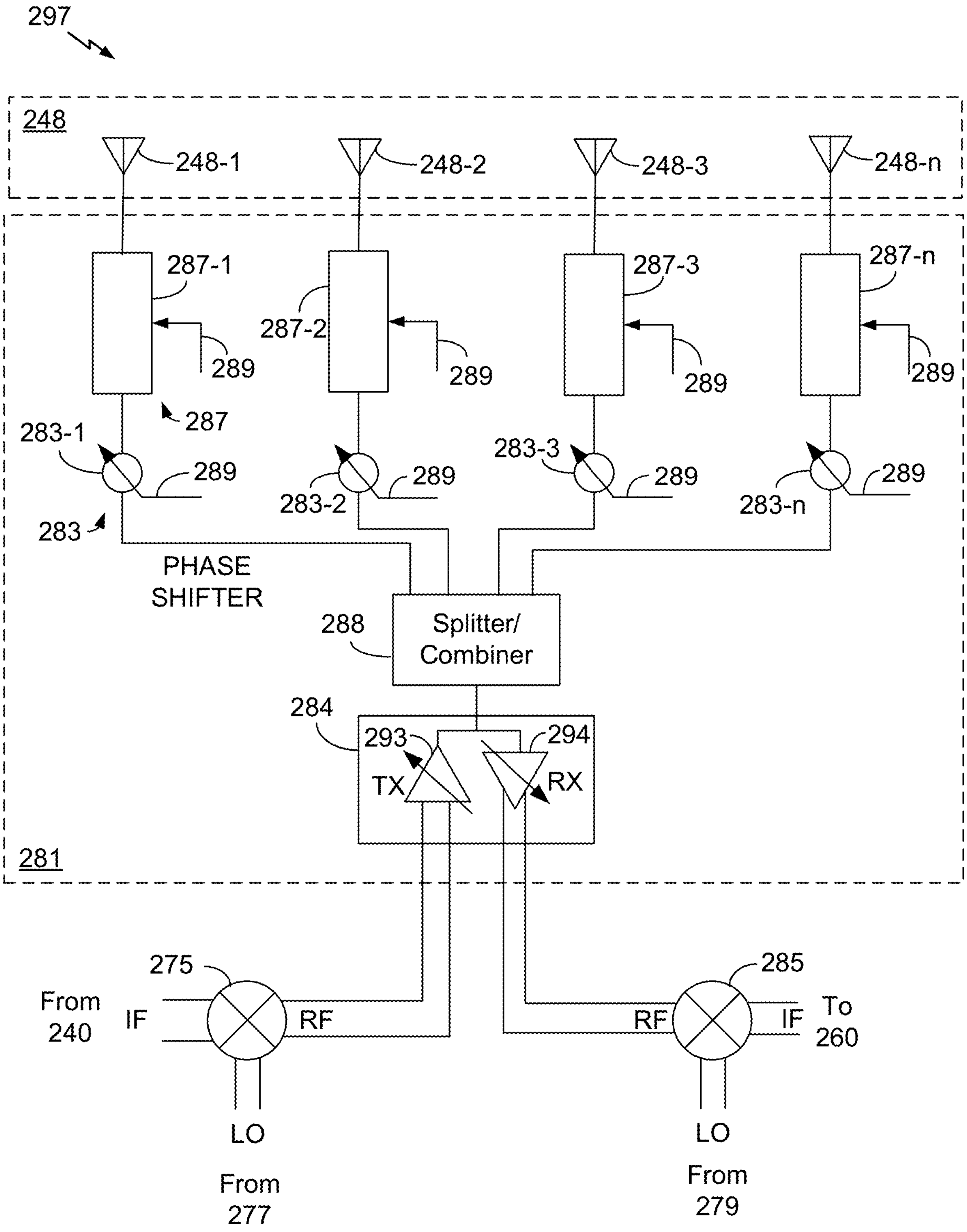
FIG. 2C is a block diagram illustrating portions of a wireless device in which aspects of the present disclosure may be implemented.

FIG. 2C is a block diagram 297 showing in greater detail an embodiment of some of the components of FIG. 2B. In an exemplary embodiment, the upconverter 275 provides an mmW transmit signal to the phase shift circuitry 281 and the downconverter 285 receives an mmW receive signal from the phase shift circuitry 281. In an exemplary embodiment, the phase shift circuitry 281 comprises an mmW variable gain amplifier (VGA) 284, a splitter/combiner 288, the phase shifters 283 and the phased array elements 287. In an exemplary embodiment, the phase shift circuitry 281 may be implemented on a millimeter-wave integrated circuit (mmWIC). In some such embodiments, the upconverter 275 and/or the downconverter 285 (or just the mixers 276, 286) are also implemented on the mmWIC. In an exemplary embodiment, the mmW VGA 284 may comprise a TX VGA 293 and an RX VGA 294. In some embodiments, the TX VGA 293 and the RX VGA 294 may be implemented independently. In other embodiments, the VGA 284 is bidirectional. In an exemplary embodiment, the splitter/combiner 288 may be an example of a power distribution network and a power combining network. In some embodiments, the splitter/combiner 288 may be implemented as a single component or as a separate signal splitter and signal combiner. The phase shifters 283 may be coupled to respective phased array elements 287. Each respective phased array element 287 is coupled to a respective antenna element in the antenna array 248. In an exemplary embodiment, phase shifters 283 and the phased array elements 287 receive control signals from the data processor 210 over connection 289. The exemplary embodiment shown in FIG. 2C comprises a 1×4 array having four phase shifters 283-1, 283-2, 283-3 and **283-*n*, four phased array elements 287-1, 287-2, 287-3 and 287-*n*, and four antennas 248-1, 248-2, 248-3 and 248-*n***. However, a 1×4 phased array is shown for example only, and other configurations, such as 1×2, 1×6, 1×8, 2×3, 2×4, or other configurations are possible.

Examples illustrated with respect to FIGS. 2B and 2C implement phase shifting (e.g., using phase shifters 283) in a signal path of the wireless device **200*a*. In other examples, the phase shifters 283 are omitted, and a phase of a signal may be adjusted by varying a phase at the mixers 276, 286. In some examples, the LO signal generators 277, 279 are configured to provide oscillating signals having varied phase in order to produce TX and/or RX signals having different phases. In some such examples, more than one mixer is implemented for the TX path and/or the RX path in the circuitry 281**.

The circuitry of FIGS. 2B and 2C can, in some implementations, generate sufficient heat to cause operation problems for a device if the heat is not appropriately dissipated. One device configuration is to attach a metallic heatsink to a mmW module supporting mmW communications, with a separate and distinct non-mmW antenna implemented in the device separate from the heatsink to prevent the heatsink from interfering with operation of the non-mmW antenna while providing sufficient heat transfer and dissipation to manage heat generated by the mmW module. As described herein, material of a hinge attached to a mmW module can be used for heat dissipation, along with alignment of a mmW antenna array to avoid device interference with mmW wireless signals as described below.

Figure 3A:
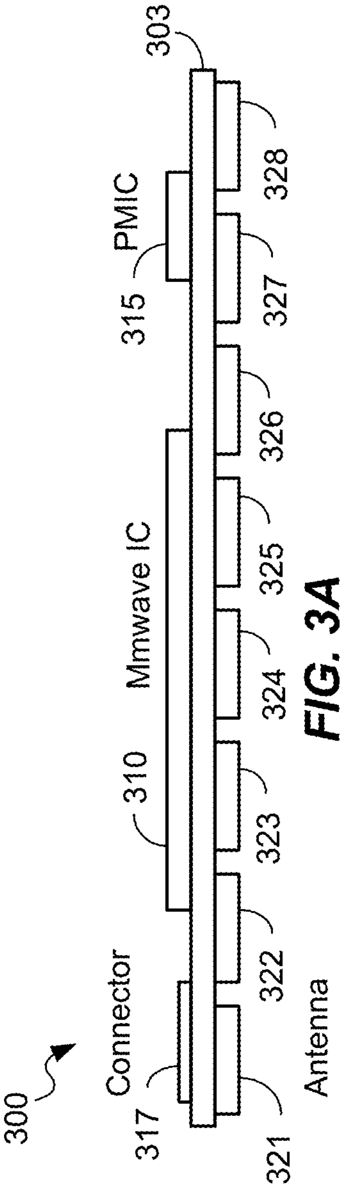
FIGS. 3A, 3B, 3C and 3D are block diagrams illustrating a mmW module in accordance with aspects of the disclosure.
Figure 3B:
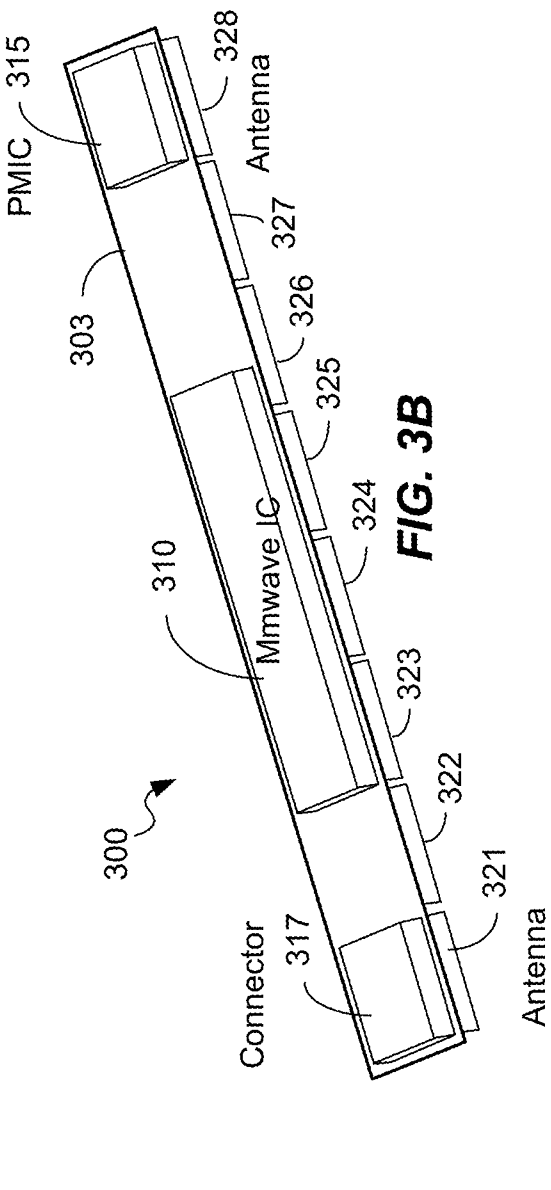
Figure 3C:
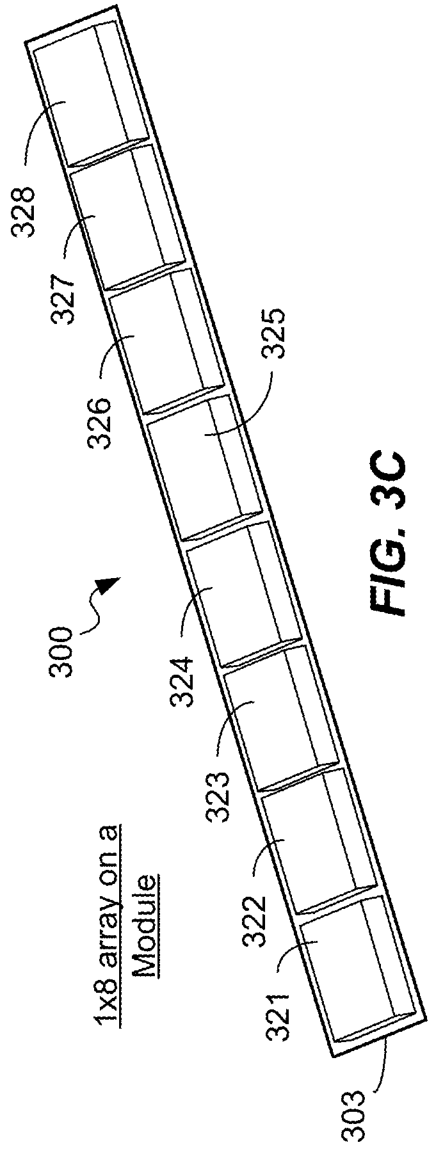

FIGS. 3A, 3B and 3C are block diagrams collectively illustrating some aspects of a millimeter wave (mmW) module in accordance with some aspects of the disclosure. As further illustrated and described below, the mmW modules of FIGS. 3A, 3B, and 3C can be integrated into a hinge customized for mmW wireless communications and a geometry of an adjustable device including joints.

FIG. 3A shows a side view of a millimeter wave (mmW) module 300. The mmW module 300 may be an example of the mmW modules 610, 710, and 810 shown in FIGS. 6-8. In some aspects, the mmW module 300 may comprise a 1×8 phased array fabricated on a substrate 303. In some aspects, the mmW module 300 may comprise a mmWIC 310, a power management IC (PMIC) 315, a connector 317 and a plurality of antenna elements 321, 322, 323, 324, 325, 326, 327 and 328 of an antenna array fabricated on a substrate 303. Fewer or additional antennas than illustrated may be implemented. Further, while linear arrays are illustrated in FIGS. 3, a two dimensional array may be implemented. Portions of the module may be covered or enclosed by a mold, shield, or housing (not shown).

FIG. 3B is a top perspective view of the mm W module 300 showing the mmWIC 310, a PMIC 315, a connector 317 and a plurality of antennas elements 321, 322, 323, 324, 325, 326, 327 and 328 on the substrate 303. While the antenna elements 321-828 are shown for ease of explanation, in some configurations the antenna elements 321-828 may not be visible in such a view, for example because they are integral and/or flush with the substrate 303. In some examples, the connector 317 is used to couple the upconverter 240, and/or the downconverter 260, and/or the functions 278, 291 (which all may be implemented external to the module 300) to the upconverter 275 and/or downconverter 285, or to the mixer 276 and/or the mixer 286 (which all may be implemented in the mmWIC 310). The PMIC 315 may be configured to supply system voltages to such components in the mmWIC 310 or other circuitry in the mmWIC 310. FIG. 3C is a bottom perspective view of the mmW module 300 showing the antenna elements 321, 322, 323, 324, 325, 326, 327 and 328 on the substrate 303.

Figure 3D:
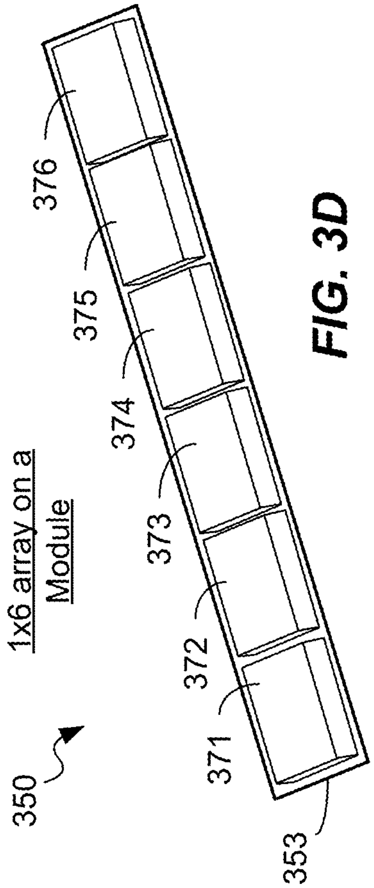

FIG. 3D shows an alternative embodiment of a millimeter wave (mmW) module 350. The mmW module 350 may be similar to the mmW module 300 shown in FIG. 3A, but is arranged as a 1×6 array. In some aspects, the mmW module 350 may comprise a 1×6 phased array fabricated on a substrate 353. In some aspects, the mmW module 350 may comprise a plurality of antenna array elements 371, 372, 373, 374, 375 and 376 fabricated on the substrate 353.

In some aspects, an antenna array with the antenna array elements 371, 372, 373, 374, 375 and 376 (or a fewer or greater number of elements) can be separate from the other elements of a module as described below with respect to FIG. 9. In other aspects, the array elements on the mmW module 350 are structured together. In both cases in accordance with aspects described herein, the antenna array elements may be positioned on a double joint with a rigid central section to orient the boresight of the antenna array (e.g., and mmW signals for the mmW module). Additionally, in aspects with the mmW module integrated in a hinge as described herein, the mmW module is attached to a thermally conductive frame or with additional thermally conductive elements of the hinge to convey thermal energy to an exterior of the mmW module 350, and then to a heatsink. Such a frame may be metallic or of any other such material suitable for providing thermal transfer of heat energy from mmW module 350 while avoiding interference with mmW signals from each of antenna array elements 371, 372, 373, 374, 375, and 376 (e.g., in an associated effective beam width for the antenna array).

Such a frame or package structure can further be particularly configured based on an expected non-mmW antenna configuration and associated physical interfaces for thermal conduction of heat energy to allow the non-mmW antenna to interact with or facilitate heat transfer of heat sink elements to dissipate thermal energy from the mmW module. Such a non-mmW integration can allow the mmW and any non-mmW antennas to operate without mutual interference. Regardless of the wireless antennas used, a wide variety of thermal transfer characteristics can be implemented via mmW module packaging, thermal adhesives, and hinge structures as described herein.

Figure 4:
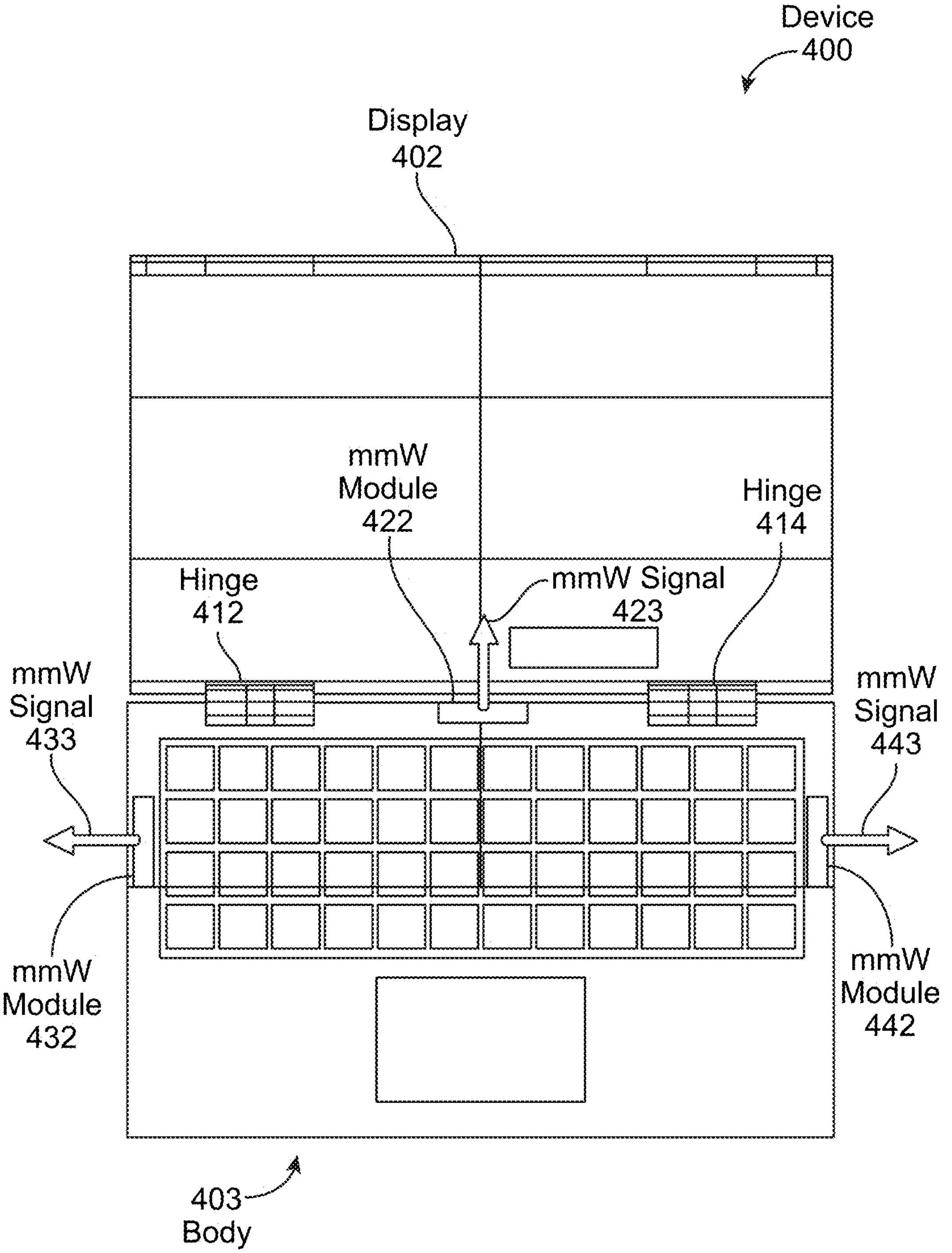
FIG. 4 illustrates aspects of an electronic device including objects connected via joints and mmW modules.

FIG. 4 illustrates aspects of an electronic device 400 including objects connected via hinges and mmW modules for mmW communications. The examples described below are primarily presented in the context of laptop computing devices such as device 400. As indicated above, however, other devices that include hinges and wireless communications, such as certain cell phone devices, tablet computing devices, or any device with an integrated screen or components configurable using a hinge structure, can be implemented in accordance with aspects described herein.

The electronic device 400 of FIG. 4 includes a display object 402 and a body object 403 as large rigid object components that are connected via two hinges 412 and 414. The hinges 412, 414 allow the display object 402 and the body object 403 to have relative positions adjusted during operation. The device 400 also illustrates an example laptop computer with multiple mmW modules 422, 432, and 442. Multiple mmW modules can be integrated into a single device due to the directionality of the communications from each mmW module 422, 432, 442. As illustrated, mmW module 432 has a mmW signal 433 with a directionality in the opposite direction from the mmW signal 443 associated with the mmW module 442. Such directionality can enable either simultaneous communication with different base stations, or communication with the same base station as the position of the device 400 rotates to change which mmW module is directed toward the active base station that the device 400 is communicating with. If the additional mmW module 422 is fixed in the keyboard body object 403 portion of the device between the hinges 412 and 414, the mmW module 422 can be oriented with a primary wireless directionality of associated mmW signal 423 in the same plane as the mmW signals 443 and 433 (as shown), or out of the plane (e.g., out of the image toward the viewer). In any fixed location on the body object 403, however, the mmW module 422 will have issues with the wireless signal being obstructed in certain hinge 412 and 414 positions.

Figure 5A:
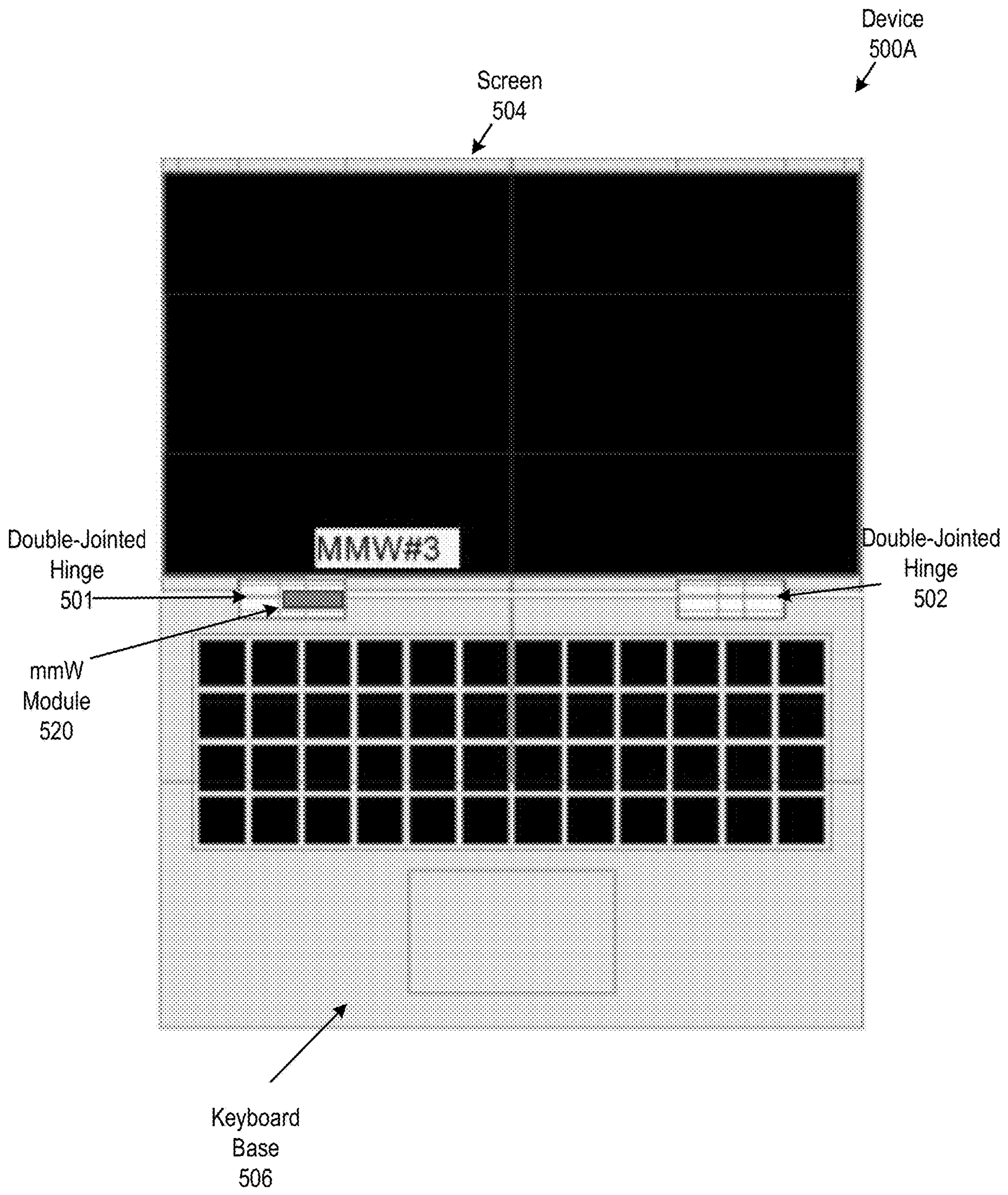
FIGS. 5A, 5B, 5C, 5D, 5E, 5F, and 5G illustrate aspects of an electronic device including objects connected via joints and mmW modules.

FIGS. 5A. 5B, 5C, 5D, and 5E illustrate aspects of an electronic device including objects connected via hinges and mmW modules. FIGS. 5A. 5B, 5C, 5D, and 5E illustrate different hinge positions of a device 500 (shown as device 500A, 500B, etc.) similar to the device 400 of FIG. 4. Positions in the figures are described relative to a closed position where a screen object is in a plane facing a keyboard in a parallel plane, with hinges used to rotate the objects away from this closed position starting from a zero degree closed position angle.

Device 500A of FIG. 5A illustrates a demonstration position with an angle between the body and the display at approximately 180 degrees. The view of FIG. 5A shows the position of the mmW module 520 on double-jointed hinge 501, with a companion double-jointed hinge 502 that allows the boresight of the mmW module 520 to be maintained (e.g., set or selected) along a line between the screen 504 and the keyboard base 506 as the joints of the double jointed hinges 501,502 are rotated through different positions. In some examples, the boresight of the mmW module 520 will be maintained along a plane as the double-jointed hinger 501 is rotated.

Figure 5B:

Device 500B of FIG. 5B illustrates an intermediate position with an angle between the body and the display slightly less than 90 degrees.

Figure 5C:
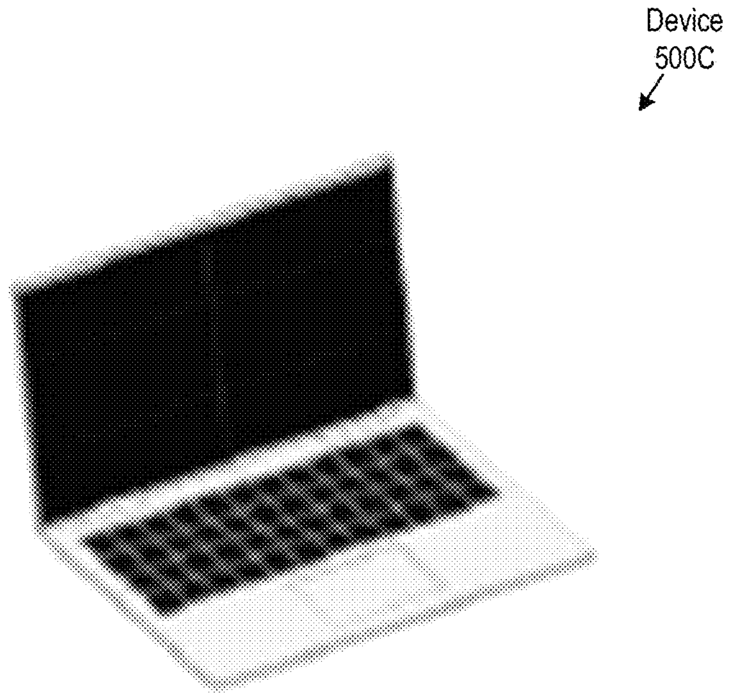

Device 500C of FIG. 5C illustrates an open laptop working position with an angle between the body and the display slightly greater than 90 degrees.

Figure 5D:
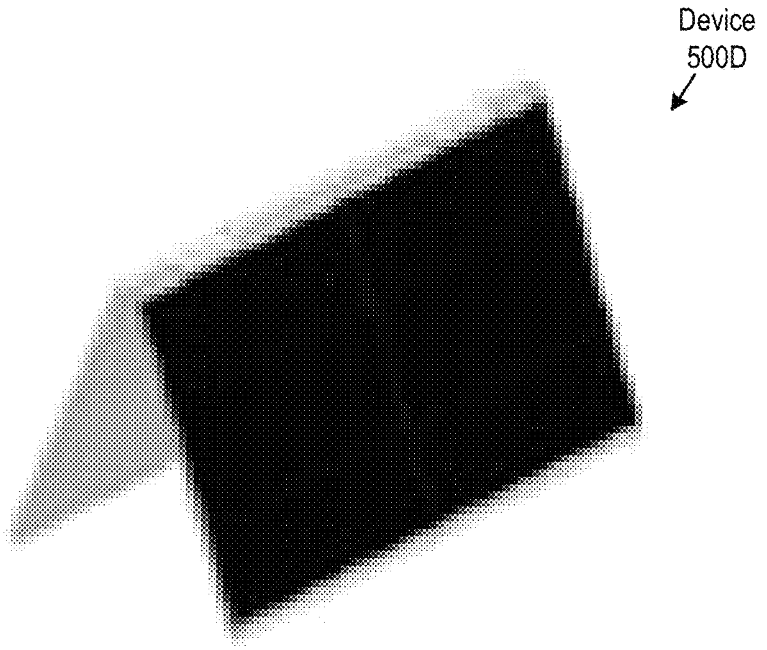

Device 500D of FIG. 5D illustrates a tent position with an angle between the body and the display greater than 180 degrees and less than 360 degrees to degrees.

Figure 5E:
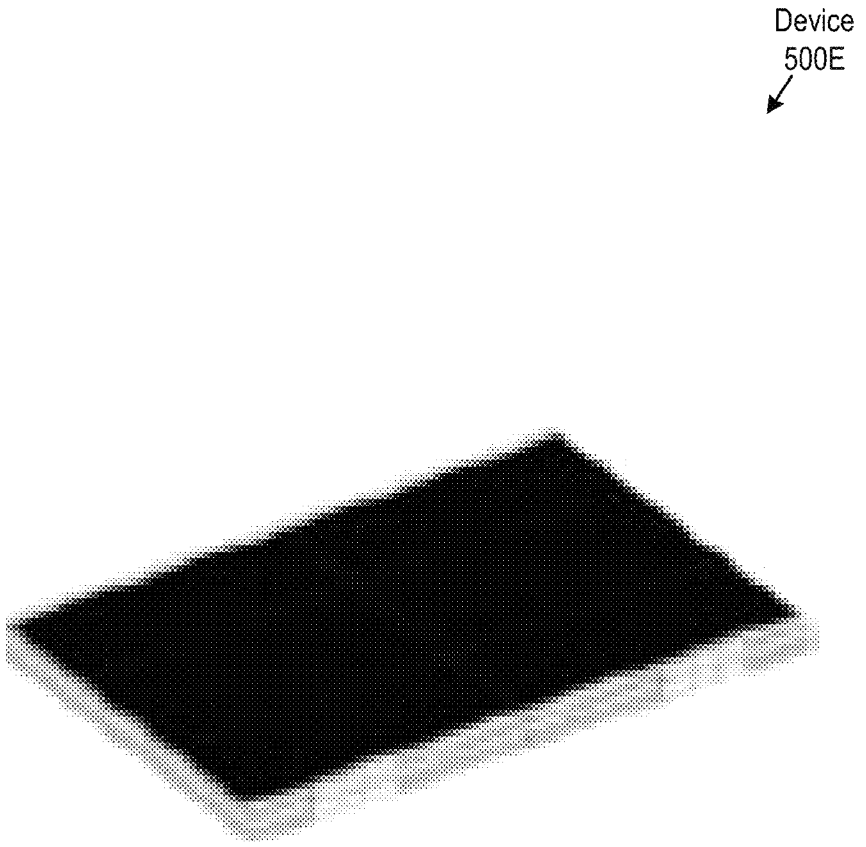

Device 500E of FIG. 5E illustrates a tablet position with an angle between the body and the display at approximately 360 degrees.

Figure 5F:
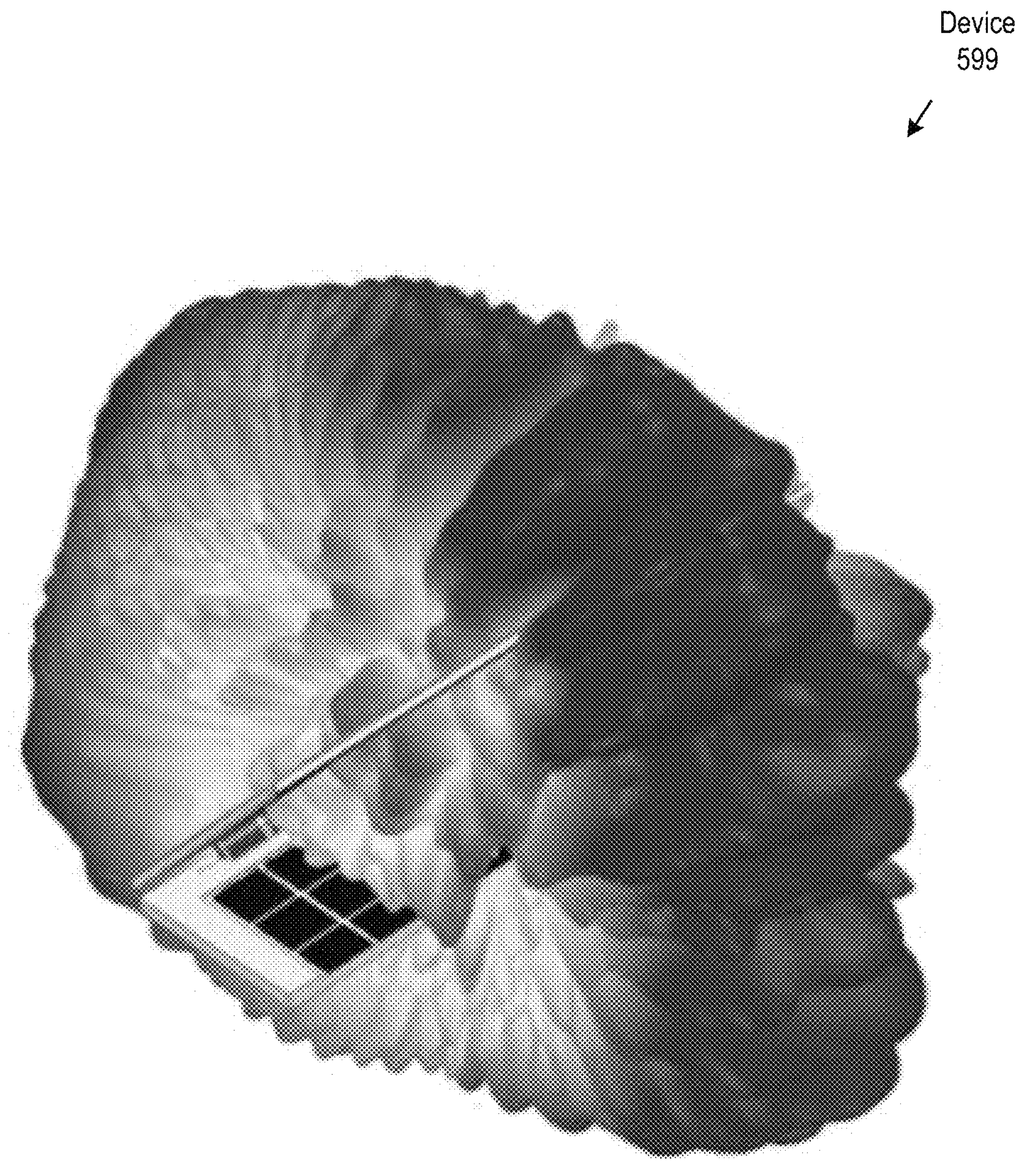

FIG. 5F illustrates a model of the signal field for a device 599 having a mmW module not mounted on a double-jointed hinge in the intermediate position similar to the device 500B of FIG. 5B.

Figure 5G:
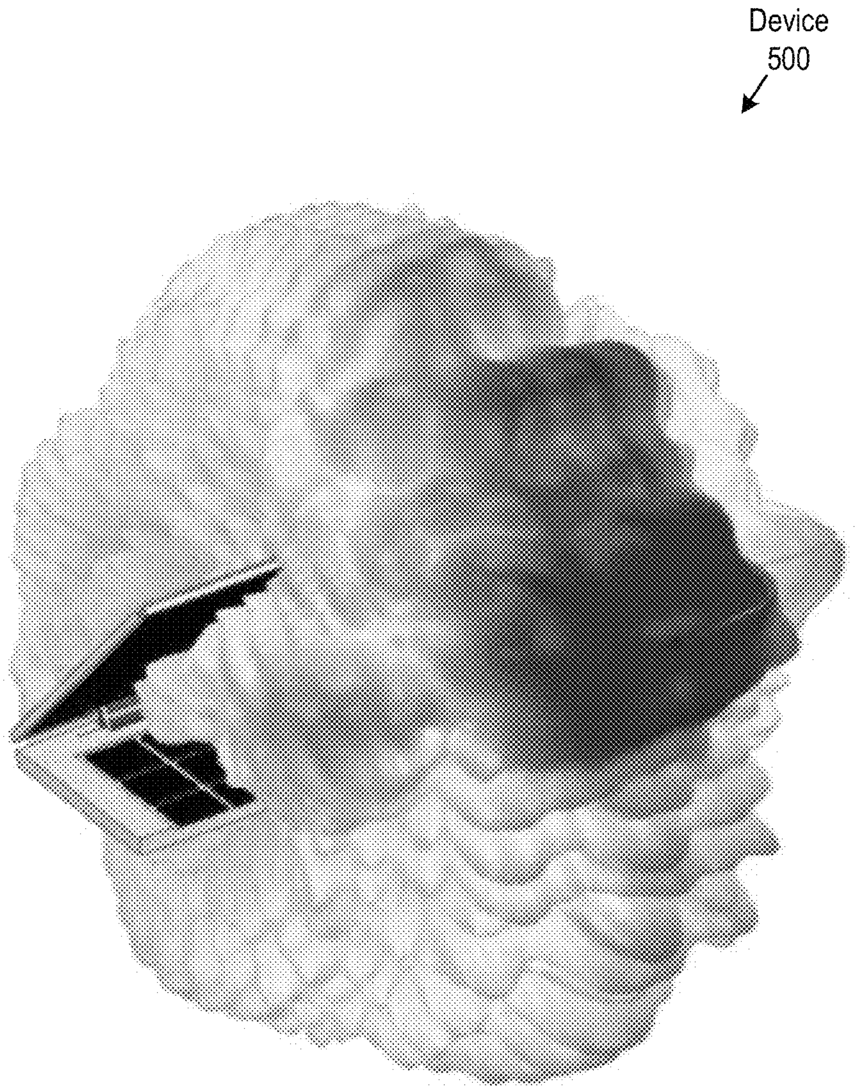

FIG. 5G illustrates a model of the signal field for the device 500 in the intermediate position of device 500B of FIG. 5B. The use of the double-jointed hinge along with constructive interference directs the signal along a boresight between the keyboard base 506 and the screen 504. In some aspects, such operation can result in 3-7 dBi improvement in wireless communication performance when compared with the performance of the device 599 illustrated in FIG. 5F.

For any orientation of a mmW module positioned near the rotation axis of the hinges (e.g., similar to the mmW module 422 of FIG. 4), at least one of the illustrated positions results in the wireless signal from the mmW module being blocked by the display object. For example, in the illustrated signal orientation of the mmW signal 423 of FIG. 4 (e.g., in the plane with the keyboard), the display object 402 will interfere with mmW signal 423 in the positions illustrated by devices 500A, 500B, and 500C of FIGS. 5A, 5B, and 5C.

If an alternate orientation of the mmW module 422 is used with the signal pointing out toward the user (e.g., perpendicular with the plane of the keyboard), the signal will be partially blocked in the positions illustrated by devices 500B and possibly 500E (e.g., depending on whether the display is pointed up during tablet use, which is an expected use where the mmW module of this configuration would point toward the ground and provide no benefit) of FIGS. 5B and 5E. Possible solutions to this issue include adding an additional mmW module for both orientations or multiple orientations, or placing the mmW module on an edge of the display object. Additional mmW module use adds cost and power usage to a device, and placement on the display edge moves the mmW module away from power and computing resources and may be mechanically challenging. Both options result in negative outcomes for a design.

Figure 6A:
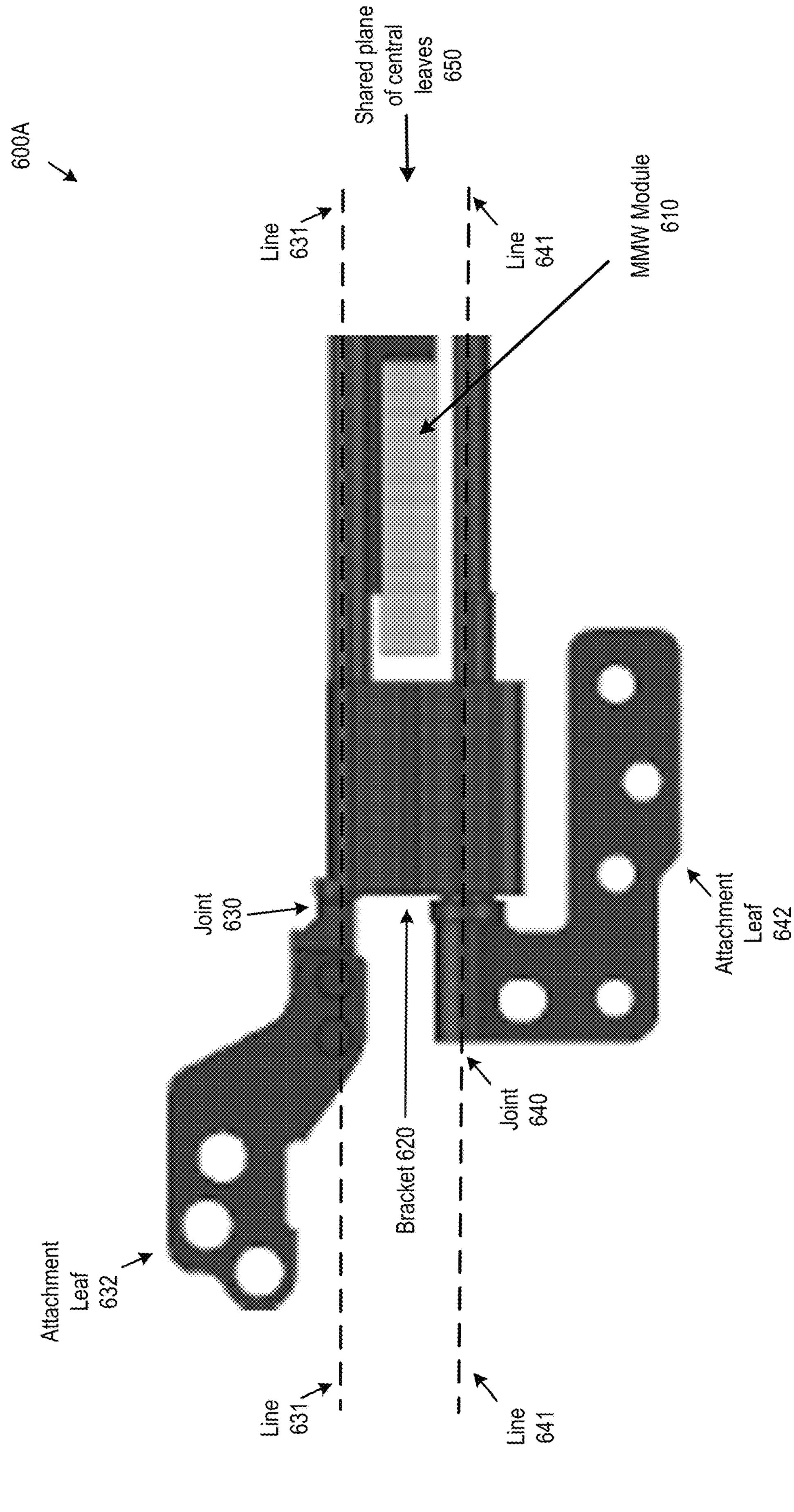
FIG. 6A illustrates a mmW integrated hinge in accordance with aspects described herein.

FIG. 6A illustrates a mmW integrated hinge 600A in accordance with aspects described herein. The hinge 600A illustrated by FIG. 6A includes a central bracket 620 with a joint 630 and a joint 640 on either side of the bracket 620. As detailed further below, the use of two joints 630, 640 allows the bracket 620 (e.g., and a mmW antenna array, illustrated in FIGS. 6A and 6B as being included in a mmW module 610) to maintain an intermediate orientation with respect to objects attached to the exterior leaves of the joints 630, 640 (e.g., a display object coupled to the attachment leaf 632 and a keyboard body object coupled to the attachment leaf 642). The hinge 600A can include a conductive node placed anywhere along the hinge to support communications between the mmW module 610 and additional processing devices/circuitry (e.g., a mmWIC or IF or baseband circuitry, for example as illustrated in FIG. 9 and/or FIG. 2) used to generate or process signals communicated via the mmW module 610.

The mmW integrated hinge 600A can be referred to as a compound or double hinge, including two joint structures with each joint 630, 640 of the mmW integrated hinge having separate degrees of freedom for rotation around a corresponding line associated with each hinge. The joints can be considered as rotationally connected elements of a hinge, or pivot points of a hinge structure. The joint 630 is associated with rotation around line 631, and the joint 640 is associated with rotation around line 641. The lines 631 and 641 are roughly parallel, and can be further supported in a device by one or more additional hinges (e.g., similar to the hinge 412 and/or the hinge 414) that provide mechanical stability for rotation of objects around the lines 631 and 641. Such additional hinges can include structures similar to the bracket 620, joint 630, and attachment leaf 632, 642 without the mmW module 610 and associated heatsink, case, or support structures for the mmW module 610 described below.

Each joint 630, 640 of the mmW integrated hinge 600A can have internal structures to allow the rotation around the corresponding line 631, 641. In some implementations, each joint includes a barrel with a pin inside the barrel running along the lines associated with the joint. Leaves are portions of a joint that extend away from internal rotation structures along a line (e.g., a barrel and/or a pin) and also revolve around the associated line. In the mmW integrated hinge 600A, the joint 630 includes internal structures to support rotation around the line 631, and has associated attachment leaf 632 which rotates around the line 631. The bracket 620 can be considered a central leaf for the joint 630, such that the joint 630 allows the attachment leaf 632 and the bracket 620 to rotate around the line 631 relative to each other. Similarly, the joint 640 also includes internal structures (e.g., a barrel and/or pin) to support rotation of the joint 640 around the line 641. The joint 640 has associated attachment leaf 642 which rotates around the line 641. The bracket 620 can be considered a central leaf for the joint 640, such that the joint 640 allows the attachment leaf 642 and the bracket 620 to rotate around the line 641 relative to each other. The bracket 620 can be considered a shared leaf of the joints 630 and 640 in the compound mmW integrated hinge 600A. Leaf 632, 642 can be configured in any size or shape to facilitate coupling to respective objects.

The lines 631 and 641 as roughly parallel lines can define a shared plane 650 of the central leaves of the joints 630 and 640. The shared plane 650 provides a central location for placement of the mmW module 610, supporting structures to attach the mmW module 610 to the bracket 620, and/or any other materials, such as non-mmW antennas, heatsink structures, etc. As can be seen, the mmW module 610 (and any antenna array thereof) is positioned between the lines 631, 641.

A basic hinge joint allows free independent rotation around the associated lines 631, 641. The mmW integrated hinge 600A, however, may be configured to avoid a free rotation placement where an object attached to one joint angles to cover the mmW module 610 while an object attached to the other leaf is at an open angle. The joint 630 and the joint 640 can thus include gearing or other physical structures to constrain the rotation around the lines 631 and 641 to threshold ranges relative to the motion of the other joint.

For example, FIG. 6A illustrates attachment leaf 632 in an open position creating a 180 degree angle with the bracket 620, and attachment leaf 642 is similarly in an open position with a 180 degree angle formed with the attachment leaf 642. Attachment of a display object and a base object would result in a position as illustrated in the device 500C. Rather than allowing free motion of the joints 630, 640 around the corresponding lines 631, 641, gearing or limitation structures between the joint 640 and the joint 630 may limit both the maximum rotation of each joint, the minimum rotation of each joint, and a relative rotation of each joint for given positions of objects attached to the attachment leaves 632, 642. For example, dampening can be used to fix the rotation in any specific angle (e.g., matched angles of multiple hinge structures) Such limitations in a joint can, for example, limit a difference of the angle formed by the attachment leaf 632 and the bracket and the attachment leaf 642 and the bracket to a threshold difference (e.g., a difference of 5 degrees, a difference of 10 degrees, a difference of 15 degrees, etc.) Such relative rotation controls allow the boresight of the mmW module to be directed to areas between the objects attached to the leaves, and avoid occlusion of wireless signals to and from the mmW module 610. Additional details of such rotational limits are described below.

Figure 6B:
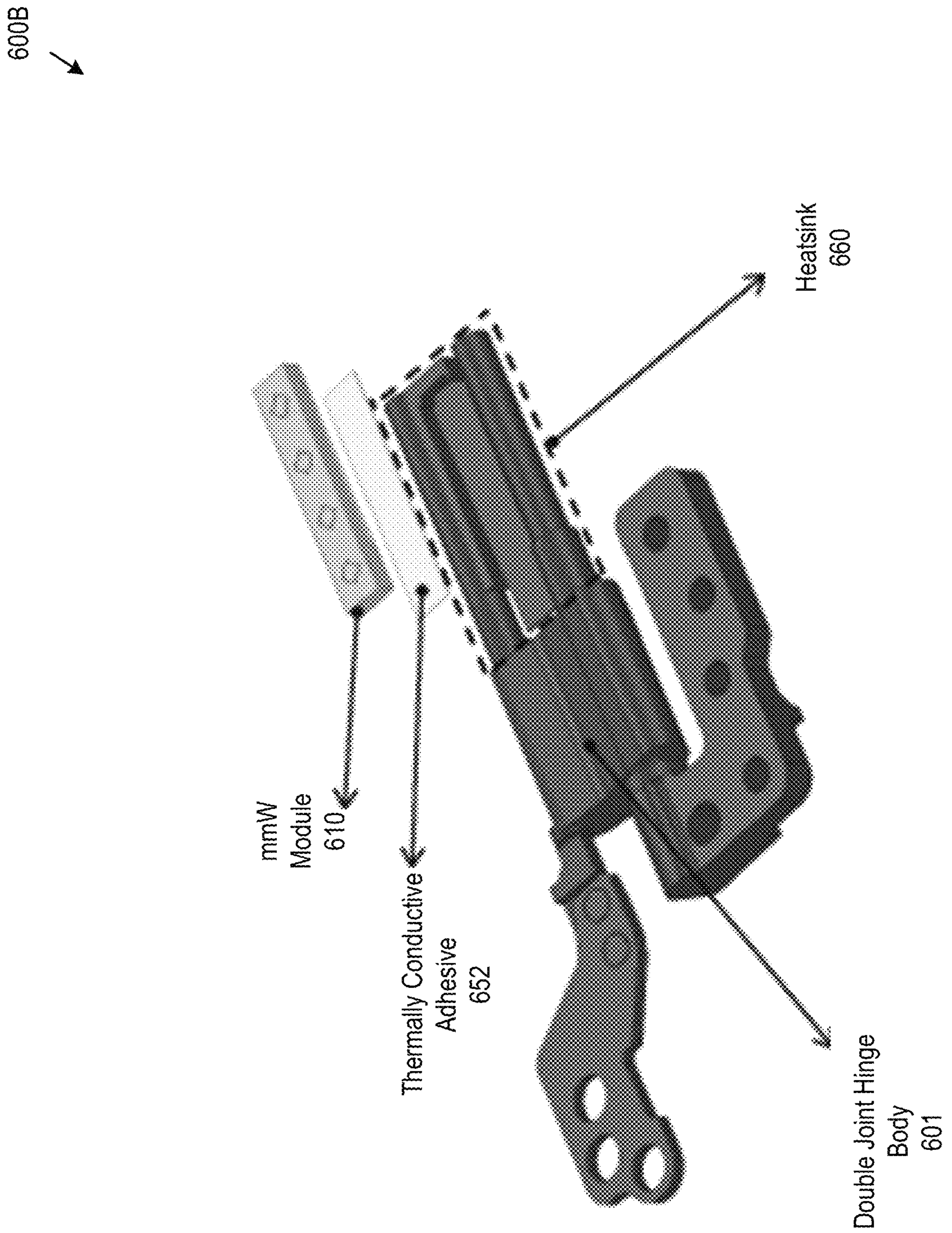
FIG. 6B illustrates a mmW integrated hinge in accordance with aspects described herein.

FIG. 6B illustrates a mmW integrated hinge 600B in accordance with aspects described herein. The mmW integrated hinge 600B is an illustration of the mmW integrated hinge 600A with the mmW module 610 and thermally conductive adhesive 652 used to attached the mmW module 610 to a heatsink 660 coupled to the bracket 620 shown in an exploded view. A double joint hinge body 601 includes the bracket 620, and the attachment leaves 632, 642 of FIG. 6A. In some aspects, the heatsink 660 can provide a physical housing structure for the mmW module 610, and can additionally provide support for non-mmW antennas. Wired electrical paths and signal ports for mmW and non-mmW signals can be routed from the mmW module 610 or a body of the heatsink 660 to attached objects (e.g., processors or other device components as part of a body object of a computing device attached to a leaf of the double joint hinge body 601). In some aspects, the heatsink 660 can be detachable from the double joint hinge body 601 via a clip, a heatsink or case slot, a friction sleeve, a connecting socket, or other attachment structures to allow replacement or modular adjustment of the mmW circuitry of the mmW integrated hinge 600B.

The thermally conductive adhesive 652 can be implemented in various ways in different aspects. In some aspects, the thermally conductive adhesive 652 is thermally conductive epoxy adhesive. Such epoxy adhesives can include silicone epoxies, polyurethane epoxies, and other such epoxy materials, which can be selected based on the expected thermal environment and desired thermal transfer characteristics. Some thermal conductive epoxies in accordance with aspects described herein have a thermal conductivity of approximately 0.5 Watts per square meter ($W/m^2$) (e.g., between approximately 0.4 and 0.6 $W/m^2$). High performance thermal epoxies may have thermal conductivity over 1.5 $W/m^2$ (e.g., between 1.5 and 3 $W/m^2$) in some implementations. In some implementations, the thermally conductive adhesive 652 can be combined with a non-adhesive thermal material to further improve heat transfer performance with a pattern of adhesive combined with non-adhesive thermal transfer material. Such non-adhesive thermal transfer materials (e.g., thermal paste, thermal grease, etc.) can have thermal conductivity characteristics up to approximately 70 $W/m^2$ using filler materials such as zinc oxide, ceramics, aluminum, copper, silver, graphite, and/or carbon nanoparticles along with other materials. In different implementations, electrically conductive or electrically non-conductive adhesives can be used, or combinations of such adhesives can be used based on a particular design and antenna operation to prevent mmW and non-mmW antennas from interfering with each other. Some such epoxies can include silver filled epoxy, graphite filled epoxy, or other such conductive epoxies. In some aspects, the thermally conductive adhesive 652 can be a thermally conductive tape material. In other aspects, other such adhesives can be used, or combinations of various adhesives can be used.

In some aspects of such an apparatus, the thermally conductive adhesive 652 is optional, or alternative heat dispersion materials can be used. In some aspects, a non-adhesive conductive material can be used at portions of the physical connection between the mmW module 610 and the heatsink 660. In such aspects, the apparatus can use alternative methods of maintaining a connection between the mmW module 610 and the heatsink 660, such as mechanical fasteners at fixed points, adhesives at certain points other than where a heat transfer material is located, or other such mechanisms for maintaining a mechanical (e.g., physical) connection. Such a mechanical connection between the mmW module 610 and the heatsink 660 can directly facilitate heat transfer from the mmW module 610 to the heatsink 660, and associated heat dispersion via the heatsink 660 without use of the thermally conductive adhesive 652. Further, it will be apparent that a mmW integrated hinge need not be configured for heat transfer in all implementations. For example, the structure used for the heatsink 660 may not be specially configured as a heatsink and/or any means for attaching radiators to the structure may not require specific heat transfer characteristics. For example, a mmW module 610 may not require such heat transfer mechanisms or heat transfer elements may instead be incorporated into a housing enclosing the mmW integrated hinge. Further, antenna arrays (that are not packaged into a module including certain circuit components) which are implemented with a mmW integrated hinge may not suffer from the same thermal constraints.

Figure 6C:
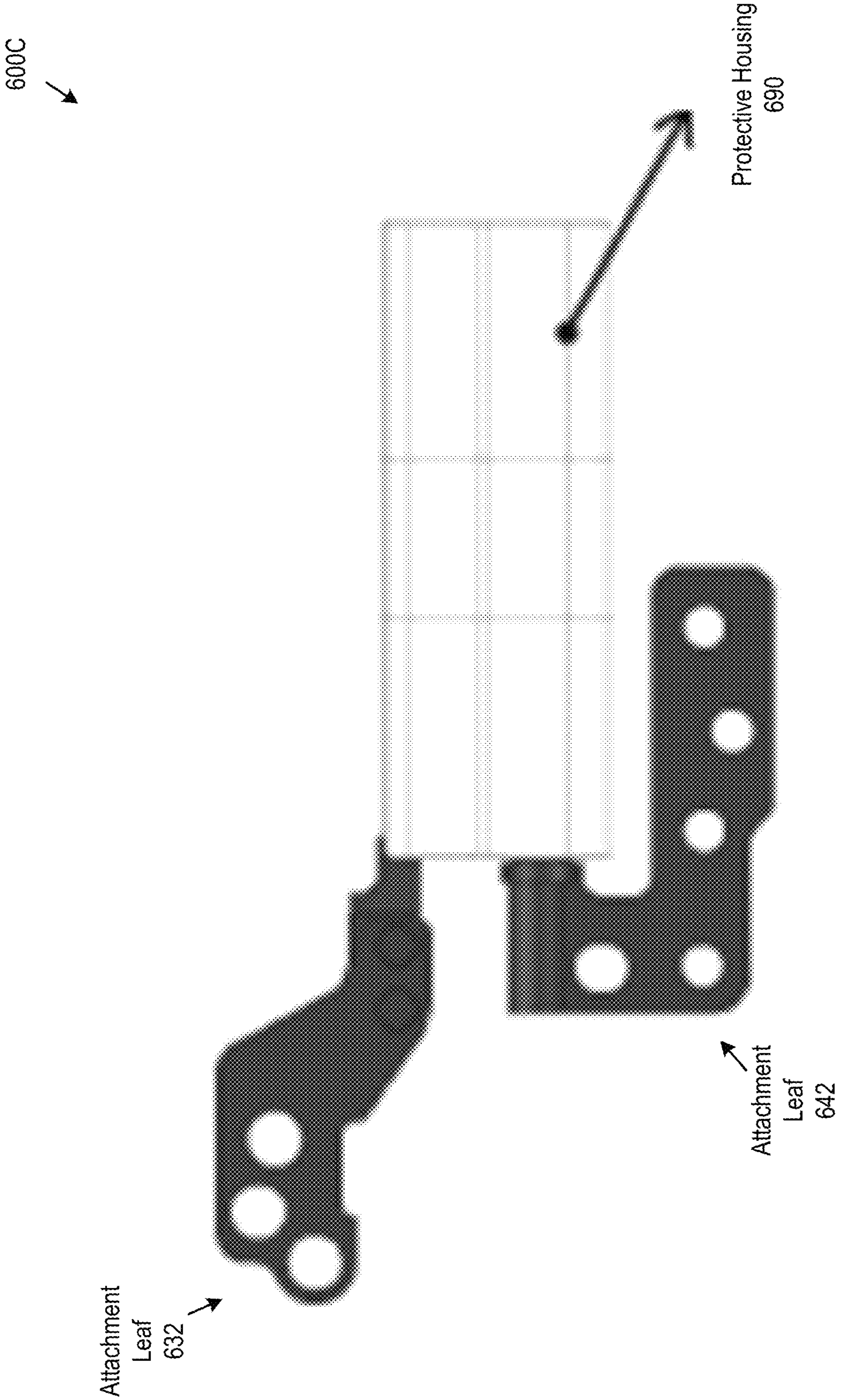
FIG. 6C illustrates a mmW integrated hinge in accordance with aspects described herein.

FIG. 6C illustrates a mmW integrated hinge 600C in accordance with aspects described herein. The mmW integrated hinge 600C illustrates a view of the mmW integrated hinge 600A of FIG. 6A and mmW integrated hinge 600B of FIG. 6B with an added protective housing 690 covering the mmW module 610 and portions of the double joint hinge body 601.

In some aspects, the protective housing 690 can be functionally integrated with the heatsink 660 to transfer heat away from the mmW module 610. In some aspects, the protective housing is a dielectric cover to prevent mechanical wear on the mmW module 610 and any non-mmW antennas coupled to the heatsink 660, with the material of the protective housing chosen to avoid interference with the wireless signals communicated to and from the mmW module 610 and any additional non-mmW antennas included in the mmW integrated hinge 600C.

As described herein, the mmW integrated hinge 600C includes one or more mmW antennas in the mmW module 610, and also can include a non-mmW antenna as part of the heatsink 660. Such a design can function with a metallic or conductive portion of the structure for the heatsink 660 integrated directly as a non-mmW antenna without sacrificing mmW or non-mmW antenna performance, and while preserving heat dispersion characteristics. By fine tuning the structure of the heatsink 660 as part of the design of the mmW integrated hinge 600C, the non-mmW antenna aspect of the heatsink 660 allows flexibility to provide antenna performance or additional radio access technology (RAT) functionality based on the particular design of the heatsink 660 and design preferences of a device including the mmW integrated hinge 600C. For example, parameters (width, length, thickness, shape, material, grounding points, distance from the mmW module 610, etc.) of the non-mmW antenna may be adjusted based on frequency at which communications may be transmitted and/or received, based on desired antenna efficiency or radiated power, based on electrical or conductive components which will be positioned near the mmW integrated hinge 600C when included in a device, etc. In some aspects, the heatsink 660 includes metal structures that can be configured for particular RAT and frequency operation, as well as providing physical structures for connections between the mmW module 610 and the heatsink 660 (e.g., using the thermally conductive adhesive 652). In some aspects, structures for physically fastening objects of a device (e.g., displays, computing elements, keyboards, etc.) to attachment leaves 632, 642 (e.g., via screw holes for fastening to frame structures of a mobile device, a laptop, a tablet, CPE, or any other such devices including mmW and non-mmW wireless communication support) are included in a device. In some aspects, the post structures along line 631 and 641 can be used to support mmW and/or non-mmW antenna structures or other such structures. In some aspects, such post structures can be used as non-mmW antennas, or they can form a slot antenna for non-mmW communication when adjacent a platform (e.g., formed by a portion of the bracket 620) on which the module 610 rests. In some aspects, one or more such posts structures may be omitted, such that only the bracket 620 is present to support the mmW module with no post structures or with only one post structure. In some aspects, the structure between lines 631 and 641 can be configured as a solid piece, instead of as the separate post structures illustrated in FIGS. 6A and 6B. In some embodiments, screws or other connectors which fasten the attachment leaves 632, 642 to a frame or chassis of a device (e.g., via the holes illustrated in FIGS. 6A, 6B, and 6C) couple the heatsink 660 and the mmW module 610 to a system ground (e.g., near each end) of a device.

In various aspects, the mmW integrated hinge 600C can be configured with additional control or communication circuitry configured to provide data signals compatible with a particular RAT. As described herein, "data signals" include signals transmitted and received as part of a communication system, ranging codes in global positioning systems, radar signals (e.g., transmissions or reflections including data about local objects), or other such codes or signals including information that can be received by an antenna and processed by control circuitry coupled to the antenna. The non-mmW antenna can receive an amplified signal via a signal feed that is particularly configured and amplified to a given gain level for the non-mmW antenna and an associated RAT. Such a RAT may, for example, have particular power transmission limits, with the data signal amplified to within a threshold level of the power transmission limits in order to provide for acceptable transmission distances while avoiding excessive electromagnetic exposure to sensitive objects or individuals near the mmW integrated hinge 600C. The heatsink in such aspects is not simply reflecting ambient signals, but is configured as a non-mmW device configured to receive signals in a particular RAT configuration and/or transmit signals in the RAT configuration, within power limits defined by the RAT standard operation. For example, the non-mmW antenna of a laptop computer integrated into the mmW integrated hinge 600C may be configured to resonate or radiate at a certain frequency so as to provide a desired gain to communication signals, operate with a desired EIRP, or perform according to another metric that is determined to be effective for wireless communication.

In one implementation, the mmW module 610 is approximately 2 millimeters (mm) wide, 3.5 mm tall, and 24 mm long. In some such implementations, the heatsink 660 can include mechanical attachments to the mmW module 610 that extend along any surface of the dimensions of the mmW module 610. In some implementations, the heatsink 660 can extend any distance past the dimensions of the mmW module to provide structure for the non-mmW antenna that makes up part of the heatsink and radiates thermal energy to a heat dissipation environment (e.g., air, a thermal dissipation liquid, etc.) In some aspects where the heatsink 660 is configured with conductive elements configured to radiate signals at non-mmW frequencies, the heatsink is designed to radiate at frequencies at or around 1.6 GHz to receive global positioning system (GPS) signals (e.g., 1.575 GHz). In other aspects, the antenna can be designed to receive other non-mmW GPS signals (e.g., 1.2276 GHZ, L2; 1.176 GHz, L5; etc.). In further aspects, the antenna can be designed to receive or transmit signals below 7 GHZ, in communication bands between 1.5 GHz and 4.75 GHz, 800 megahertz (MHz) to 1.2 GHz, 600 MHz to 700 MHz (e.g., LTE low bands), 6 GHz to 7 GHZ (e.g., WiFi 6E bands), or at other such non-mmW frequencies or frequency ranges, for example to communicate according to a 5G, 4G (LTE), 3G, 2G, WiFi (e.g., 2.4 GHz, GHz, etc.), Bluetooth, etc. standard or according to another communication protocol or strategy.

Figure 7:
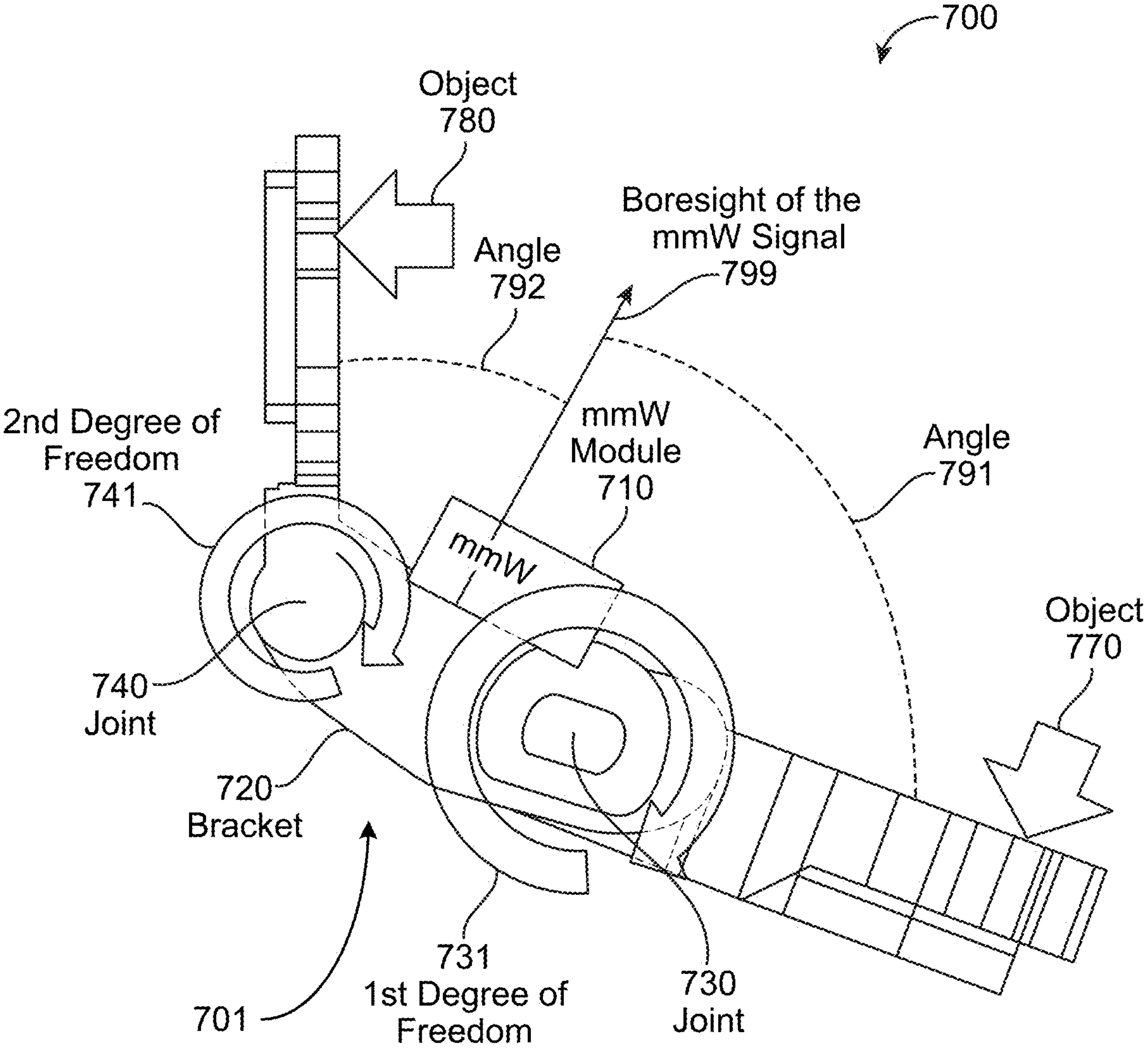
FIG. 7 illustrates a mmW integrated hinge in accordance with aspects described herein.

FIG. 7 illustrates a device 700 including a mmW integrated hinge 701 in accordance with aspects described herein. The device 700 includes an object 780 and an object 770 attached to a mmW integrated hinge 701 that controls the relative positions of the objects 770, 780. Similar to the mmW integrated hinge 600A, 600B, and 600C of FIGS. 6A, 6B, and 6C, the hinge 701 of the device 700 includes multiple joints 730, 740 with separate lines of rotation to provide a first degree of freedom 731 around the joint 730 and a second degree of freedom around the joint 740. The rotations around the separate joints 730, 740 are offset by the size of the bracket 720 which provides for a placement of a mmW antenna array (illustrated in FIG. 7 as being included in a mmW module 710) between the joints 730, 740 of the hinge 701 (e.g., in a plane similar to the shared plane 650 described above, although the structure(s) coupling the array to the hinge 701 may support the array such that it is displaced from the shared plane 650, as illustrated in FIG. 7).

The mmW module is positioned so that a boresight 799 of the antenna array (of the mm W module 710) is roughly perpendicular to the bracket and the plane between the lines of rotation around the separate joints 730, 740. The angle 792 represents a difference in orientation between the object 780 and the boresight 799, and the angle 791 represents a difference in orientation between the object 770 and the boresight 799. By using two joints 730 and 740 with offset lines of rotation, when either angle 792 or angle 791 becomes zero, the objects 770 and 780 become roughly parallel with the boresight 799 rather than aligning or intersecting. Limits on the first degree of freedom 731 and the second degree of freedom 741 may prevent the angles 791, 792 from becoming negative and directly blocking the boresight 799.

Additionally, as described above, gearing or physical connections between the joints 730 and 740 can create dependent relationships between the rotation of the objects 770, 780 around corresponding joints. For example, such a dependency can attempt to maintain roughly equal values of the angles 791 and 792, (e.g., within a threshold tolerance such as plus or minus 5 degrees or plus or minus 10 degrees) so that the signals from the mmW module 710 along the boresight 799 (e.g., as determined by placement of elements of the mmW antenna array of the mmW module 710) are directed between the objects 770 and 780. Such use of the mmW integrated hinge 701 improves performance of the device 700 by avoiding degradation of mmW signals from the mmW module due to positioning of the joints 730, 740, which, if able to swing freely, could allow the objects 770, 780 to block the mmW signals.

Figure 8A:
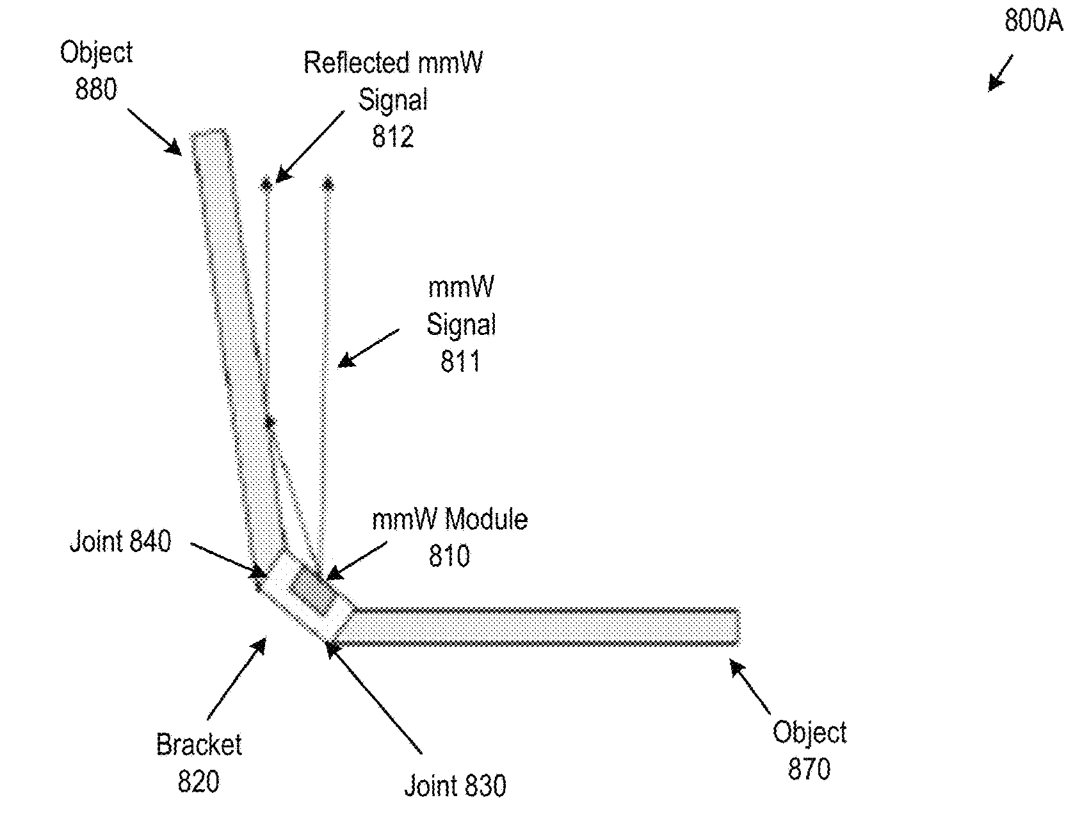
FIGS. 8A and 8B illustrate a mmW integrated hinge in accordance with aspects described herein.
Figure 8B:
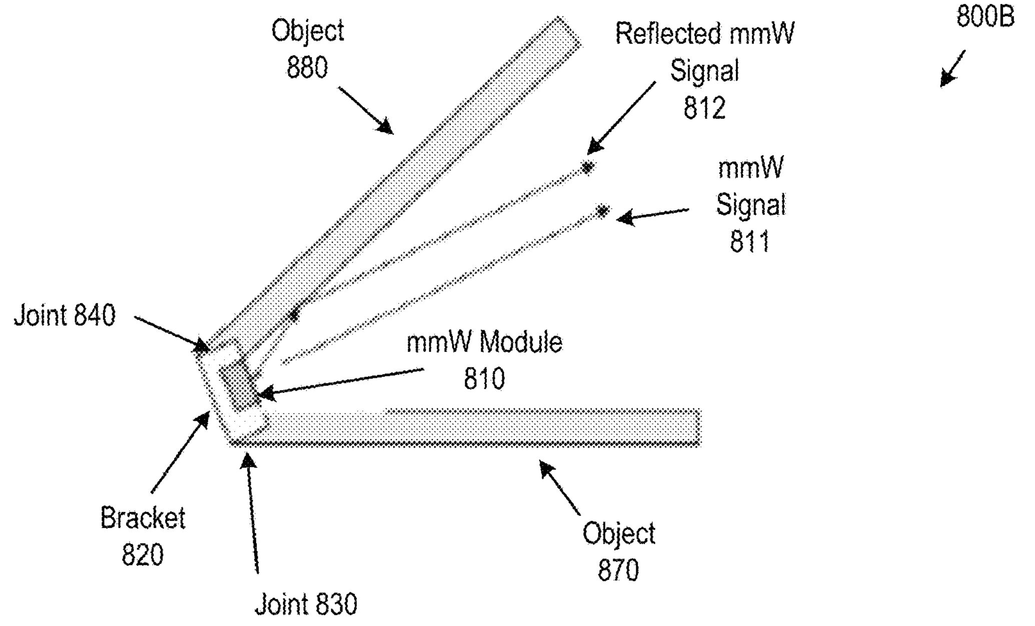

FIGS. 8A and 8B illustrate a device 800 with views 800A and 800B including a mmW integrated hinge in accordance with aspects described herein. Discussed above with respect to FIG. 7, joints 830, 840 of a mmW hinge (e.g., including the bracket 820, joint 830, and joint 840) can be coupled to created dependencies between the positioning of the joints to prevent blockage of mmW signals and to improve device performance. While some such dependencies match angles between objects attached to opposing attachment leaves of a hinge, in other aspects, other such relationships can be structured by the mmW integrated hinge.

FIGS. 8A and 8B illustrates a device 800 that includes an object 880 and an object 870 (e.g., a display and base of a laptop computer) connected by a mmW integrated hinge comprising a bracket 820, joints 830, 840, and a mmW antenna array (illustrated in FIGS. 8A and 8B as being included in a mmW module 810) integrated with the bracket

820 similar to the description of the mmW integrated hinge 600A, 600B, and/or 600C described above. A mmW signal from a mmW module is not a vector, but includes lobes, side lobes, and complex shapes matching the geometry of the mmW antenna (e.g., array element placement, etc.). In some implementations, reflections off of an object coupled to a mmW integrated hinge can cause constructive interference, improving the quality of the signal received by a mmW module 810 or transmitted from a mmW module 810. As illustrated in FIGS. 8A and 8B, the mmW signal 811 and the reflected mmW signal 812 are both signals that can interfere either constructively or destructively depending on the design of the device 800. In some aspects, the motion of the joints 830 and 840 can be configured to lock-in or have restricted or "sticky" motion at rotational positions associated with constructive interference between primary (e.g., direct) mmW signals 811 and reflected mmW signals 812. If one object, such as the object 880, provides improved performance with reflections, the position of the nearest joint (e.g., joint 840) can be fixed or structured in a preferred position (e.g., where additional force is needed to adjust the rotational angle) while the other joint (e.g., joint 830) is allowed greater freedom of rotation (e.g., due to the object 870 absorbing or scattering energy from the mmW module 810 rather than contributing to the reflected mmW signals 812).

In different aspects, different physical restrictions or designs can be used to manage the relative rotations of the joints 830, 840 in a mmW integrated compound hinge to both prevent attached objects such as the objects 870 and 880 from blocking the mmW signal, and to allow improved performance (e.g., such as via positions that create constructive interference with the reflected signals 812).

Figure 9:
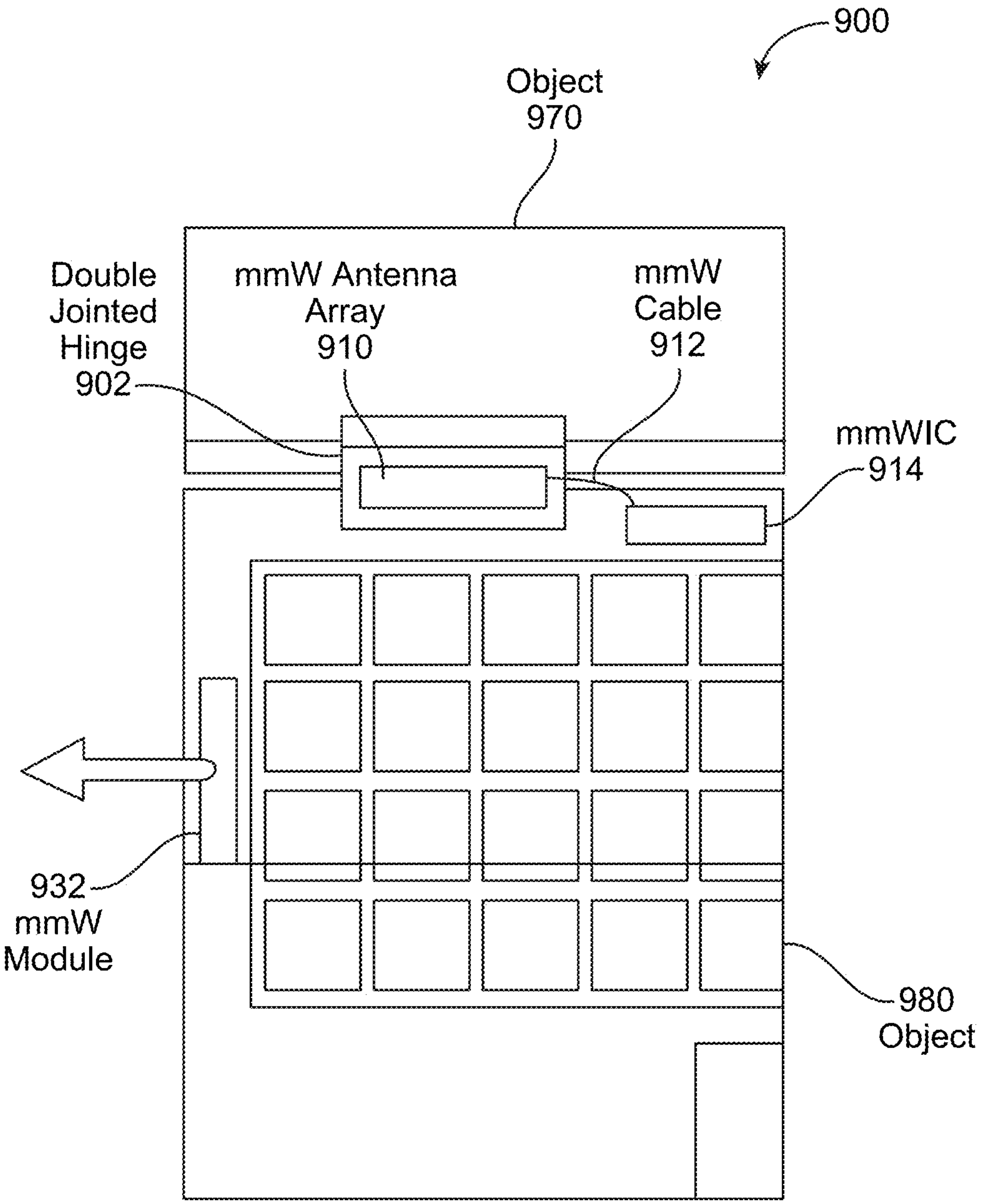
FIG. 9 illustrates a mmW antenna array integrated hinge with separate mmW integrated circuitry in accordance with aspects described herein.

FIG. 9 illustrates a device 900 having a mmW antenna array 910 integrated hinge with separate mmW integrated circuitry 914 in accordance with aspects described herein. The device 900 in FIG. 9 is illustrated as a portion of a laptop device with a double jointed hinge 902 that can be similar to the structure of the mmW integrated hinge 600 described in FIGS. 6A, 6B, and 6C above. The hinge 902 couples the object 970 (e.g., a display) to the object 980 (e.g., a computer body and keyboard). The double jointed hinge 902, however, rather than integrating an entire mmW module, includes a mounted mmW antenna array 910, with a flexible mmW cable 912 that provides a signal path from the mmW antenna array 910 as integrated in the double jointed hinge 902, to a mmW integrated circuit (mmWIC) 914 in an object body attached to the double jointed hinge 902. Such a configuration can allow the mmW IC 914 to be more closely integrated with additional computing circuitry of the object 980 attached to the double jointed hinge 902 in accordance with aspects described herein, while maintaining the benefits of the mmW signal orientation described above with respect to FIGS. 7, 8A, and 8B. In some aspects, additional mmW modules such as the mmW module 932 can be included in addition to the mmW antenna array 910 integrated in the hinge 902, and any number of mmW antenna arrays and/or mmW modules can be included in different aspects of such a device.

In some examples, the mmW antenna array or module may not be directly attached to the hinge, but may be coupled in fixed relation to the bracket 620. For example, the array or module may be coupled to or affixed within a housing of the hinge or enclosing the hinge and the array/module. In one such aspect, the array or module may be disposed in the protective housing 690, but not directly connected to the hinger in the manner illustrated in FIGS. 6A and 6B. In another such aspect, the array or module is included in a housing similar to the housing 690 that encloses the entirety of the hinge. In some such aspects, the housing may be part of the hinge construction or may be a component of the electronic device in which the hinge is included (e.g., a laptop). For example, the mmW antenna array may be disposed within a hinge cover or cavity of the electronic device.

Figure 10:
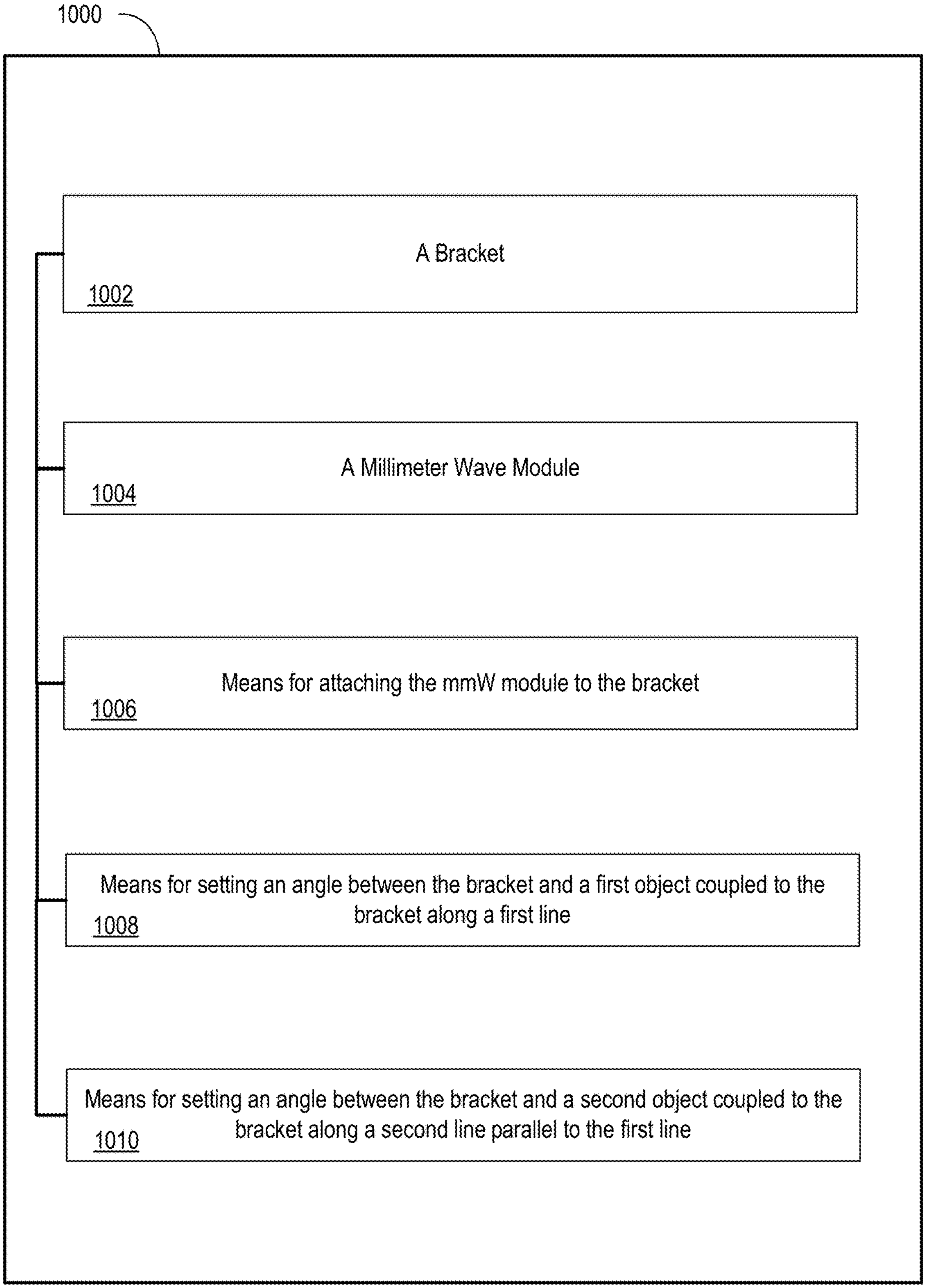
FIG. 10 is a functional block diagram of an apparatus including a mmW module and an integrated heatsink with a non-mmW antenna in accordance with some aspects.

FIG. 10 is a functional block diagram of an apparatus with a mmW integrated hinge in accordance with some aspects. The apparatus 1000 comprises a bracket 1002, which can be the bracket 620, the bracket 720, the bracket 820, a central portion (e.g., bracket or shared central leaf) of the double jointed hinge 902, or any similar structure described herein.

The apparatus further comprises a millimeter wave (mmW) array 1004. The mmW array 1004 can be connected to (e.g., packaged together with) a mmWIC, or can be communicatively coupled to a mmW IC. The mmW array 1004 can be included in the mmW module 300, the mmW module 610, the mmW module 710, the mmW module 810, or any such mmW module described herein, or implemented in a non-module configuration, as described above.

The apparatus further comprises means 1006 for attaching the mmW array 1004 to the bracket. Means 1006 can include a thermal heatsink, adhesive, or packaging structure that can attach or integrate the mmW array 1004 to the bracket 1002.

The apparatus further comprises means 1008 for setting an angle between the bracket and a first object coupled to the bracket along a first line. The means 1008 can include a pivot structure or joint of a hinge in accordance with any details provided herein, such as the joint 630 and/or the attachment leaf 632 of FIGS. 6A, 6B, and 6C, the joint 740 of FIG. 7, the joint 840 of FIGS. 8A, and 8B, or any such structure described herein.

The apparatus further comprises means 1010 for setting an angle between the bracket and a second object coupled to the bracket along a second line parallel to the first line. Similar to the means 1008, the means 1010 can include a pivot structure or joint of a hinge in accordance with any details provided herein, such as the joint 640 and/or the attachment leaf 642 of FIGS. 6A, 6B, and 6C, the joint 730 of FIG. 7, the joint 840 of FIGS. 8A, and 8B, or any such structure described herein. Means 1008 and 1010 can be either joint of a double jointed hinge to form two angle setting elements of the double jointed hinge.

As described above, for both means 1008 and 1010, the mechanism within the hinge for setting the angle can vary depending on the implementation, and can include a free hinge with mechanical limits, geared limiters that maintain given angles as the alternate joint pivots, friction limiters on joint rotation, or other physical limiters for setting or selecting an angle of objects attached to either side of a double jointed hinge as described in FIGS. 5A-5E.

Figure 11:
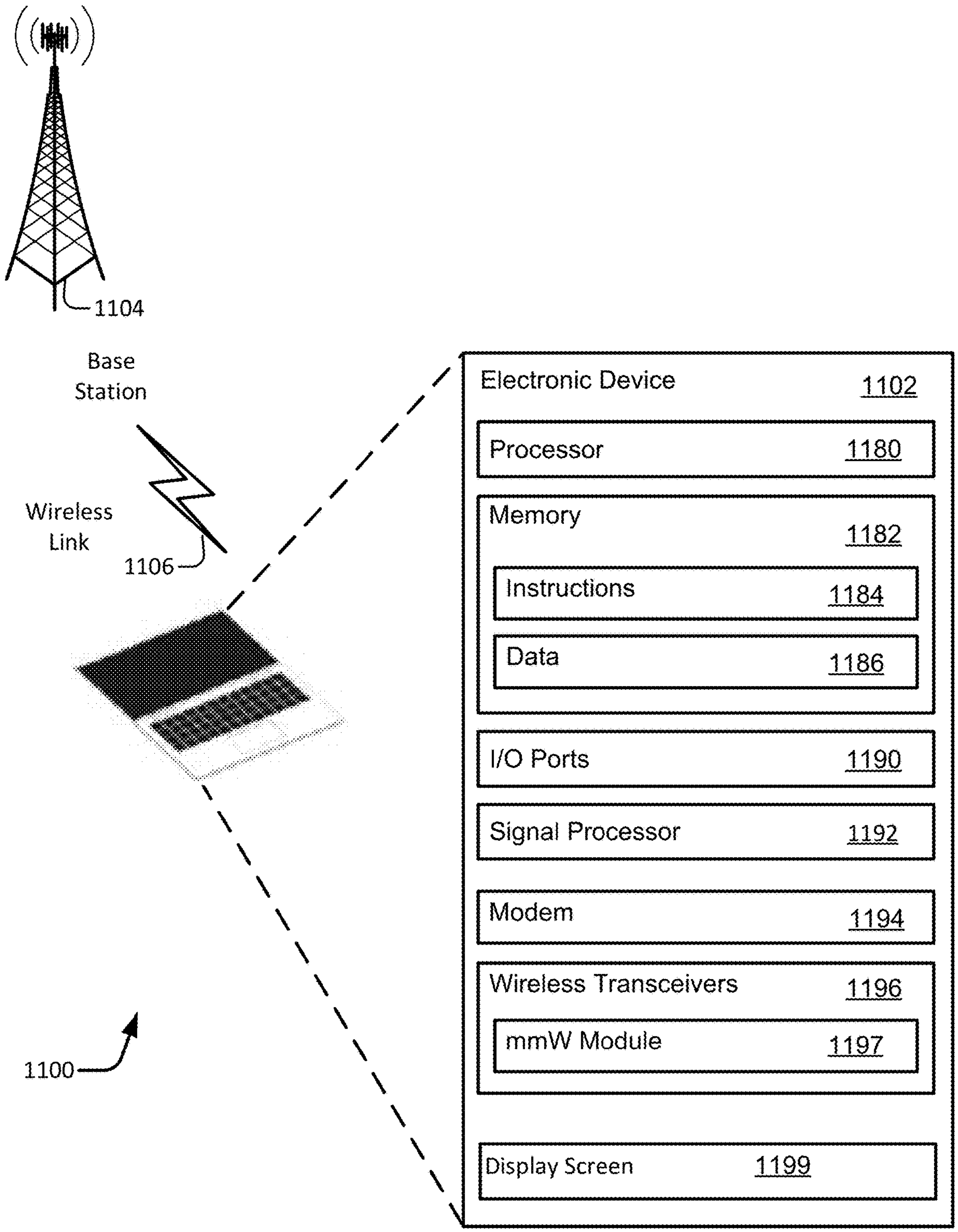
FIG. 11 is a diagram showing a wireless communication system communicating with a wireless device that can be implemented according to aspects described herein.

FIG. 11 is a diagram of an environment 1100 that includes an electronic device 1102 that includes a wireless transceiver 1196. Further, as illustrated, the wireless transceiver 1196 can include one or more mmW modules 1197. The mmW modules 1197 can be implemented in a mmW integrated hinge as described herein to improve communication performance of the electronic device 1102. In other examples, the electronic device 1102 includes a mmW array implemented separate from mmW circuitry (e.g., not packaged together in a module), which array may be included with a hinge as described above.

In some aspects, the electronic device 1102 includes a display screen 1199 that can be used to display information associated with data transmitted via wireless link 1106 and processed using components of electronic device 1102 described below. In the environment 1100, the electronic device 1102 communicates with a base station 1104 through a wireless link 1106. As shown, the electronic device 1102 is depicted as a laptop. However, the electronic device 1102 may be implemented as any suitable computing or other electronic device, such as a cellular or mobile phone, gaming device, navigation device, media device, tablet computer, Internet of Things (IoT) device, sensor or security device, asset tracker, and so forth with any such device implemented using a hinge structure in accordance with aspects described herein.

The base station 1104 communicates with the electronic device 1102 via the wireless link 1106, which may be implemented as any suitable type of wireless link. Although depicted as a base station tower of a cellular radio network, the base station 1104 may represent or be implemented as another device, such as a satellite, terrestrial broadcast tower, access point, peer to peer device, mesh network node, fiber optic line, another electronic device generally as described above, and so forth. Hence, the electronic device 1102 may communicate with the base station 1104 or another device via a wired connection, a wireless connection, or a combination thereof. The wireless link 1106 can include a downlink of data or control information communicated from the base station 1104 to the electronic device 1102 and an uplink of other data or control information communicated from the electronic device 1102 to the base station 1104. The wireless link 1106 may be implemented using any suitable communication protocol or standard, such as 3rd Generation Partnership Project Long-Term Evolution (3GPP LTE, 3GPP NR 5G), IEEE 802.11, IEEE 802.16, Bluetooth™, and so forth.

The electronic device 1102 includes a processor 1180 and a memory 1182. The memory 1182 may be or form a portion of a computer readable storage medium. The processor 1180 may include any type of processor, such as an application processor or a multi-core processor, that is configured to execute processor-executable instructions (e.g., code) stored by the memory 1182. The memory 1182 may include any suitable type of data storage media, such as volatile memory (e.g., random access memory (RAM)), non-volatile memory (e.g., Flash memory), optical media, magnetic media (e.g., disk or tape), and so forth. In the context of the disclosure, the memory 1182 is implemented to store instructions 1184, data 1186, and other information of the electronic device 1102, and thus when configured as or part of a computer readable storage medium, the memory 1182 does not include transitory propagating signals or carrier waves.

The electronic device 1102 may also include input/output (I/O) ports 1190. The I/O ports 1190 enable data exchanges or interaction with other devices, networks, or users or between components of the device.

The electronic device 1102 may further include a signal processor (SP) 1192 (e.g., such as a digital signal processor (DSP)). The signal processor 1192 may function similar to the processor 1180 and may be capable of executing instructions and/or processing information in conjunction with the memory 1182.

For communication purposes, the electronic device 1102 also includes a modem 1194, a wireless transceiver 1196, and an antenna (not shown). The wireless transceiver 1196 provides connectivity to respective networks and other electronic devices connected therewith using radio-frequency (RF) wireless signals and may include the transceiver circuitry implemented to include a mmW integrated hinge in accordance with aspects described herein. The wireless transceiver 1196 may facilitate communication over any suitable type of wireless network, such as a wireless local area network (LAN) (WLAN), a peer to peer (P2P) network, a mesh network, a cellular network, a wireless wide area network (WWAN), a navigational network (e.g., the Global Positioning System (GPS) of North America or another Global Navigation Satellite System (GNSS)), and/or a wireless personal area network (WPAN).

Devices, networks, systems, and certain means for transmitting or receiving signals described herein may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a “sub-6 GHz” band in various documents and articles, and will be referred to herein as “sub-7 GHz”. A similar nomenclature issue sometimes occurs with regard to FR2, which is often referred to (interchangeably) as a “millimeter wave” (mmW) band in documents and articles, despite including frequencies outside of the extremely high frequency (EHF) band (30 GHz-300 GHz) which is identified by the International Telecommunications Union (ITU) as a “mmWave” or mmW band.

The circuit architecture described herein may be implemented on one or more ICs, analog ICs, mmWICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1: A wireless communication apparatus, comprising: a bracket; a first pivot structure attached to the bracket configured to pivot the bracket around a first line; and a second pivot structure attached to the bracket and configured to pivot the bracket around a second line, wherein the second line is parallel to the first line; and a millimeter wave (mmW) antenna array mounted to the bracket, wherein the mmW antenna array is positioned between the first line and the second line.

Aspect 2: The wireless communication apparatus according to Aspect 1, wherein the mmW antenna array is configured to radiate mmW signals in a boresight direction perpendicular to a plane formed by the first line and the second line at frequencies greater than 20 gigahertz (GHz).

Aspect 3: The wireless communication apparatus according to any of Aspects 1 through 2, further comprising a mmW module coupled to the bracket, wherein the mmW module is positioned between the first line and the second line of the bracket.

Aspect 4: The wireless communication apparatus according to Aspect 3, wherein the mmW module is mounted to the bracket via a heatsink coupled to the bracket.

Aspect 5: The wireless communication apparatus according to Aspect 3, wherein the mmW module is coupled to the heatsink via a heat dispersion adhesive.

Aspect 6: The wireless communication apparatus according to any of Aspects 1 through 5, wherein a pivot position of the first pivot structure and a pivot position of the second pivot structure are configured to orient the mmW antenna array to limit signal obstruction from objects attached to the first pivot structure and the second pivot structure.

Aspect 7: The wireless communication apparatus according to any of Aspects 1 through 6, further comprising a first electrical device coupled to a first leaf of the first pivot structure, wherein the bracket is coupled to a second leaf of the first pivot structure, such that the first leaf and the second leaf pivot independently around the first line.

Aspect 8: The wireless communication apparatus according to any of Aspects 1 through 7, wherein the first electrical device comprises a millimeter wave integrated circuit (MMWIC), wherein the MMWIC is coupled to the mmW antenna array via a flexible mmW cable.

Aspect 9: The wireless communication apparatus according to any of Aspects 1 through 8, wherein the wireless communication apparatus comprises a laptop computer, wherein the first electrical device further comprises one or more processors and a keyboard.

Aspect 10: The wireless communication apparatus according to Aspect 7, further comprising a display screen coupled to a first leaf of the second pivot structure, wherein the bracket is coupled to a second leaf of the second pivot structure, such that the bracket is configured between the first pivot structure and the second pivot structure with two degrees of freedom relative to the display screen attached to the first leaf of the first pivot structure.

Aspect 11: A wireless communication apparatus, comprising: a millimeter wave (mmW) module comprising a mmW antenna array; at least one mmW signal node configured to communicate mmW signals in association with the mmW antenna array; a first joint having an attachment leaf and a central leaf; and a second joint having an attachment leaf and a central leaf; wherein the central leaf of the first joint and the central leaf of the second joint are configured in a shared plane to align the mmW antenna array of the mmW module to limit signal obstruction from objects attached to the attachment leaf of the first joint and the attachment leaf of the second joint.

Aspect 12: The wireless communication apparatus according to Aspect 11, wherein the mmW antenna array is configured to radiate the mmW signals in a boresight direction perpendicular to the shared plane at frequencies greater than 20 gigahertz (GHz).

Aspect 13: The wireless communication apparatus according to any of Aspects 1 through 12, wherein the mmW module is mounted to a heatsink coupled to the central leaf of the first joint or the central leaf of the second joint.

Aspect 14: The wireless communication apparatus according to Aspect 13, wherein the mmW module is coupled to the heatsink via a heat dispersion adhesive.

Aspect 15: The wireless communication apparatus according to any of Aspects 11 through 14, wherein: the mmW module is mounted to the bracket; and the bracket is coupled to the central leaf of the first joint and the central leaf of the second joint such that the first joint creates a first degree of freedom for rotation of the first joint around a first line and the second joint creates a second degree of freedom for rotation of the second joint around a second line parallel to the first line.

Aspect 16: The wireless communication apparatus according to Aspect 15, wherein the mmW module is removably mounted to the bracket via a socket comprising an electrical connection that provides a data path from the mmW module to a first object of the objects attached to the attachment leaf of the first joint.

Aspect 17: The wireless communication apparatus according to any of Aspects 11 through 16, wherein a first object of the objects is a computing device comprising one or more processors and a keyboard attached to the attachment leaf of the first joint.

Aspect 18: The wireless communication apparatus according to any of Aspects 11 through 17, wherein a second object of the objects is a display screen attached to the attachment leaf of the second joint.

Aspect 19: The wireless communication apparatus according to any of Aspects 11 through 18, wherein the first joint and the second joint are configured to orient the mmW antenna array with a boresight between the display screen and the keyboard and the first joint and the second joint rotate the keyboard and the display screen from a closed position where the keyboard is facing the display screen in parallel planes to an open position where the keyboard is facing away from the display screen in parallel planes.

Aspect 20: The wireless communication apparatus according to Aspect 19, wherein the computing device comprises: a second mmW module, wherein the boresight of the mmW module is directed in a first direction relative to the central leaf, and boresight of the second mmW module is directed in a second direction relative to the central leaf that is different than the first direction; and a third mmW module having a boresight directed in a third direction different from the second direction and the first direction.

Aspect 21: The wireless communication apparatus according to any of Aspects 11 through 20, wherein the bracket is configured to function as a heatsink mechanically coupled to the mmW module to facilitate heat transfer away from the mmW module and to radiate heat into air around the bracket.

Aspect 22: The wireless communication apparatus according to Aspect 21, wherein the heatsink is configured to dissipate heat received from the mmW module via a thermally conductive adhesive.

Aspect 23: The wireless communication apparatus according to any of Aspects 21 through 22, further comprising a non-mmW antenna integrated with the heatsink.

Aspect 24: A wireless communication apparatus comprising: a bracket; a millimeter wave (mmW) module comprising a mmW antenna array; means for attaching the mmW module to the bracket; means for setting an angle between the bracket and a first object coupled to the bracket along a first line; and means for setting an angle between the bracket and a second object coupled to the bracket along a second line parallel to the first line.

Aspect 25: The wireless communication apparatus according to Aspect 24, further comprising means for dispersing heat from the mmW module.

Aspect 26: The wireless communication apparatus according to any of Aspects 24 through 25, further comprising a non-mmW antenna integrated with the bracket.

Aspect 27: The wireless communication apparatus according to any of Aspects 24 through 26, The wireless communication apparatus of claim 24, further comprising means for communicating electrical signals with processing circuitry, wherein the electrical signals are generated by received mmW signals or used by the mmW module to generate transmitted mmW signals.

Aspect 28: The wireless communication apparatus according to any of Aspects 24 through 27, further comprising a second millimeter wave (mmW) module separate from the first mmW module, wherein the first mmW module has a boresight in a first direction separate from a second direction of a boresight of the second mmW module.

Aspect 30: A wireless communication apparatus, comprising: a display; a keyboard; a millimeter wave (mmW) phased array coupled in a fixed relationship with a hinge, the hinge coupled between the display and the keyboard such that a boresight of the phased array can be rotated independent of a position of the keyboard and the display.

Aspect 31: A method for operating a wireless communication apparatus according to any of the aspects above.

Aspect 32: An apparatus comprising means for performing operations according to any of the aspects above.

Aspect 33: A non-transitory computer-readable storage medium comprising instructions stored thereon which, when executed by one or more processors, cause the one or more processors to implement operations according to any of the aspects above.

What is claimed is:

1. A wireless communication apparatus, comprising:

a bracket;

a first pivot structure attached to the bracket configured to pivot the bracket around a first line;

a second pivot structure attached to the bracket and configured to pivot the bracket around a second line, wherein the second line is parallel to the first line; and a millimeter wave (mmW) antenna array mounted to the bracket, wherein the mmW antenna array is positioned between the first line and the second line, wherein the mmW antenna array is configured to radiate mmW signals in a boresight direction between an interior surface of a first leaf attached to the first pivot structure and an interior surface of a second leaf attached to the second pivot structure when an angle between the interior surface of the first leaf and the interior surface of the second leaf is acute.

2. The wireless communication apparatus of claim 1, wherein the boresight direction is perpendicular to a plane formed by the first line and the second line at frequencies greater than 20 gigahertz (GHz).

3. The wireless communication apparatus of claim 1 wherein the mmW antenna array is packaged in a mmW module coupled to the bracket, wherein the mmW module is positioned between the first line and the second line of the bracket.

4. The wireless communication apparatus of claim 3, wherein the mmW module is mounted to the bracket via a heatsink coupled to the bracket.

5. The wireless communication apparatus of claim 4, wherein the mmW module is coupled to the heatsink via a heat dispersion adhesive.

6. The wireless communication apparatus of claim 1, wherein a pivot position of the first pivot structure and a pivot position of the second pivot structure are configured to orient the mmW antenna array to limit signal obstruction from objects attached to the first pivot structure and the second pivot structure.

7. The wireless communication apparatus of claim 1, further comprising a first electrical device coupled to the first leaf of the first pivot structure, wherein the bracket is coupled to a third leaf of the first pivot structure, such that the first leaf and the third leaf pivot around the first line.

8. The wireless communication apparatus of claim 7, wherein the first electrical device comprises a millimeter wave integrated circuit (MMWIC), wherein the MMWIC is coupled to the mmW antenna array via a flexible mmW cable.

9. The wireless communication apparatus of claim 7 wherein the wireless communication apparatus comprises a laptop computer, wherein the first electrical device further comprises one or more processors and a keyboard.

10. The wireless communication apparatus of claim 7, further comprising a display screen coupled to the second leaf of the second pivot structure, wherein the bracket is coupled to a fourth leaf of the second pivot structure, such that the bracket is configured between the first pivot structure and the second pivot structure with two degrees of freedom relative to the display screen attached to the second leaf of the second pivot structure.

11. A wireless communication apparatus, comprising:

a millimeter wave (mmW) module comprising:

a mmW antenna array; and at least one signal node configured to communicate signals in association with the mmW antenna array to and from a processing device;

a first joint having an attachment leaf and a central leaf; and a second joint having an attachment leaf and a central leaf;

wherein the central leaf of the first joint and the central leaf of the second joint are configured in a shared plane to align the mmW antenna array of the mmW module to limit signal obstruction from objects attached to the attachment leaf of the first joint and the attachment leaf of the second joint, and wherein the mmW antenna array is configured to radiate mmW signals in a boresight direction between an interior surface of the first joint attachment leaf and an interior surface of the second joint attachment leaf when an angle between the interior surface of the first joint attachment leaf and the interior surface of the second joint attachment leaf is less than 180 degrees.

12. The wireless communication apparatus of claim 11, wherein the boresight direction is perpendicular to the shared plane at frequencies greater than 20 gigahertz (GHz).

13. The wireless communication apparatus of claim 11, wherein the mmW module is mounted to a heatsink coupled to the central leaf of the first joint or the central leaf of the second joint.

14. The wireless communication apparatus of claim 13, wherein the mmW module is coupled to the heatsink via a heat dispersion adhesive.

15. The wireless communication apparatus of claim 11, further comprising a bracket, wherein:

the mmW module is mounted to the bracket; and the bracket comprises the central leaf of the first joint and the central leaf of the second joint such that the first joint creates a first degree of freedom for rotation of the first joint around a first line and the second joint creates a second degree of freedom for rotation of the second joint around a second line parallel to the first line.

16. The wireless communication apparatus of claim 15, wherein the mmW module is removably mounted to the bracket via a socket comprising an electrical connection that provides a data path from the mmW module to a first object of the objects attached to the attachment leaf of the first joint.

17. The wireless communication apparatus of claim 15, wherein the bracket is configured to function as a heatsink mechanically coupled to the mmW module to facilitate heat transfer away from the mmW module and to radiate heat into air around the bracket.

18. The wireless communication apparatus of claim 17, wherein the heatsink is configured to dissipate heat received from the mmW module via a thermally conductive adhesive.

19. The wireless communication apparatus of claim 18, further comprising a non-mmW antenna integrated with the heatsink.

20. The wireless communication apparatus of claim 11, wherein a first object of the objects is a computing device comprising one or more processors and a keyboard attached to the attachment leaf of the first joint.

21. The wireless communication apparatus of claim 20, wherein a second object of the objects is a display screen attached to the attachment leaf of the second joint.

22. The wireless communication apparatus of claim 21, wherein the first joint and the second joint are configured to orient the boresight direction between the display screen and the keyboard and the first joint and the second joint rotate the keyboard and the display screen from a closed position where the keyboard is facing the display screen in parallel planes to an open position where the keyboard is facing away from the display screen in parallel planes.

23. The wireless communication apparatus of claim 22, wherein the computing device comprises:

a second mmW module, wherein the boresight direction of the mmW module is directed in a first plane different from the shared plane, and boresight of the second mmW module is directed in a second direction that is not parallel to the first plane; and a third mmW module having a boresight directed in a third direction that is different from the second direction and is not parallel to the first plane.

24. A wireless communication apparatus comprising:

a bracket;

a millimeter wave (mmW) antenna array;

means for attaching the mmW antenna array to the bracket;

means for setting an angle between the bracket and a first object coupled to the bracket along a first line; and means for setting an angle between the bracket and a second object coupled to the bracket along a second line parallel to the first line, wherein the mmW antenna array is configured to radiate mmW signals in a boresight direction between an interior surface of the first object and an interior surface of the second object when an angle between the interior surface of the first object and the interior surface of the second object is acute.

25. The wireless communication apparatus of claim 24, wherein the mmW antenna array is packaged in a mmW module with a mmW integrated circuit, and wherein the means for attaching comprises means for attaching the mmW module to the bracket.

26. The wireless communication apparatus of claim 25, further comprising means for dispersing heat from the mmW module.

27. The wireless communication apparatus of claim 24, further comprising a non-mmW antenna integrated with the bracket.

28. The wireless communication apparatus of claim 24, further comprising means for communicating electrical signals with processing circuitry, wherein the electrical signals are generated by mmW signals received by the mmW antenna array or used by the mmW antenna array to generate transmitted mmW signals.

29. The wireless communication apparatus of claim 24, wherein the boresight direction of the mmW antenna array is maintained along a plane, and wherein the wireless communication apparatus further comprises a second mmW antenna array separate from the mmW antenna array, wherein a boresight direction of the second mmW antenna array is orthogonal to the plane.

* * * * *